United States Patent
Bhat et al.

(10) Patent No.: US 10,169,905 B2
(45) Date of Patent: Jan. 1, 2019

(54) SYSTEMS AND METHODS FOR ANIMATING MODELS FROM AUDIO DATA

(71) Applicant: LoomAi, Inc., San Francisco, CA (US)

(72) Inventors: Kiran Bhat, San Francisco, CA (US); Akash Garg, Irvine, CA (US); Michael Daniel Flynn, Fairfax, VA (US); Will Welch, San Francisco, CA (US)

(73) Assignee: LoomAi, Inc., San Francisco, CA (US)

( * ) Notice: Subject to any disclaimer, the term of this patent is extended or adjusted under 35 U.S.C. 154(b) by 0 days.

(21) Appl. No.: 15/885,667

(22) Filed: Jan. 31, 2018

(65) Prior Publication Data

US 2018/0174348 A1 Jun. 21, 2018

Related U.S. Application Data

(63) Continuation of application No. 15/632,251, filed on Jun. 23, 2017.

(Continued)

(51) Int. Cl.
*G06T 13/40* (2011.01)
*G06T 7/11* (2017.01)

(Continued)

(52) U.S. Cl.
CPC .............. *G06T 13/40* (2013.01); *G06F 3/005* (2013.01); *G06K 9/00234* (2013.01); *G06K 9/00255* (2013.01); *G06K 9/00281* (2013.01); *G06K 9/6218* (2013.01); *G06T 7/11* (2017.01); *G06T 7/13* (2017.01); *G06T 7/248* (2017.01);

(Continued)

(58) Field of Classification Search
None
See application file for complete search history.

(56) References Cited

U.S. PATENT DOCUMENTS 6,047,078 A 4/2000 Kang
6,088,042 A 7/2000 Handelman et al.
(Continued)

FOREIGN PATENT DOCUMENTS

EP 1884896 A2 2/2008
KR 20140033088 A 3/2014
(Continued)

OTHER PUBLICATIONS

International Search Report and Written Opinion for International Application PCT/US2010/033797, completed Jun. 11, 2010, 5 pgs.
(Continued)

*Primary Examiner* — Michelle Chin
(74) *Attorney, Agent, or Firm* — KPPB LLP

(57) ABSTRACT

System and methods for computer animations of 3D models of heads generated from images of faces is disclosed. A 2D captured image that includes an image of a face can be received and used to generate a static 3D model of a head. A rig can be fit to the static 3D model to generate an animation-ready 3D generative model. Sets of rigs can be parameters that each map to particular sounds. These mappings can be used to generate a playlists of sets of rig parameters based upon received audio content. The playlist may be played in synchronization with an audio rendition of the audio content.

21 Claims, 40 Drawing Sheets
(25 of 40 Drawing Sheet(s) Filed in Color)

Related U.S. Application Data

(60) Provisional application No. 62/367,233, filed on Jul. 27, 2016, provisional application No. 62/353,944, filed on Jun. 23, 2016.

(51) Int. Cl.

| | | |
|---|---|---|
| *G06T 7/13* | (2017.01) | |
| *G06T 7/73* | (2017.01) | |
| *G06T 7/90* | (2017.01) | |
| *G06T 15/04* | (2011.01) | |
| *G06T 17/20* | (2006.01) | |
| *G06F 3/00* | (2006.01) | |
| *G06K 9/00* | (2006.01) | |
| *G06T 7/246* | (2017.01) | |
| *G06K 9/62* | (2006.01) | |
| *G06T 13/20* | (2011.01) | |
| *G06T 19/20* | (2011.01) | |

(52) U.S. Cl.
CPC ............ *G06T 7/73* (2017.01); *G06T 7/90* (2017.01); *G06T 13/205* (2013.01); *G06T 15/04* (2013.01); *G06T 17/20* (2013.01); *G06T 19/20* (2013.01); *G06T 2207/10016* (2013.01); *G06T 2207/10024* (2013.01); *G06T 2207/20021* (2013.01); *G06T 2207/20036* (2013.01); *G06T 2207/20081* (2013.01); *G06T 2207/20084* (2013.01); *G06T 2207/30201* (2013.01); *G06T 2219/2012* (2013.01); *G06T 2219/2021* (2013.01)

(56) References Cited

U.S. PATENT DOCUMENTS

| | | |
|---|---|---|
| 6,278,466 B1 | 8/2001 | Chen |
| 6,466,215 B1 | 10/2002 | Matsuda et al. |
| 6,535,215 B1 | 3/2003 | Wideman et al. |
| 6,552,729 B1 | 4/2003 | Di Bernardo et al. |
| 6,554,706 B2 | 4/2003 | Kim et al. |
| 6,556,196 B1 | 4/2003 | Blanz et al. |
| 6,700,586 B1 | 3/2004 | Demers |
| 6,714,200 B1 | 3/2004 | Talnykin et al. |
| 7,149,330 B2 | 12/2006 | Liu et al. |
| 7,168,953 B1 | 1/2007 | Poggio et al. |
| 7,209,139 B1 | 4/2007 | Keet et al. |
| 7,372,536 B2 | 5/2008 | Shah et al. |
| 7,433,490 B2 | 10/2008 | Huang et al. |
| 7,522,165 B2 | 4/2009 | Weaver |
| 7,859,546 B2 | 12/2010 | Gornowicz et al. |
| 7,937,253 B2 | 5/2011 | Anast et al. |
| 8,004,519 B2 | 8/2011 | Gornowicz et al. |
| 8,035,643 B2 | 10/2011 | Pighin et al. |
| 8,112,254 B1 | 2/2012 | Bhat et al. |
| 8,130,225 B2 | 3/2012 | Sullivan et al. |
| 8,144,153 B1 | 3/2012 | Sullivan et al. |
| 8,174,528 B1 | 5/2012 | Conran et al. |
| 8,199,152 B2 | 6/2012 | Sullivan et al. |
| 8,237,729 B1 | 8/2012 | Hery |
| 8,390,628 B2 | 3/2013 | Harding et al. |
| 8,537,164 B1 | 9/2013 | Pighin et al. |
| 8,542,236 B2 | 9/2013 | Sullivan et al. |
| 8,553,037 B2 | 10/2013 | Smith et al. |
| 8,610,716 B1 | 12/2013 | Conran et al. |
| 8,614,714 B1 | 12/2013 | Koperwas et al. |
| 8,624,904 B1 | 1/2014 | Koperwas et al. |
| 8,649,555 B1 | 2/2014 | Bhat et al. |
| 8,659,596 B2 | 2/2014 | Corazza et al. |
| 8,666,119 B1 | 3/2014 | Bhat et al. |
| 8,681,158 B1 | 3/2014 | Sullivan et al. |
| 8,704,832 B2 | 4/2014 | Aguiar et al. |
| 8,744,121 B2 | 6/2014 | Polzin et al. |
| 8,749,556 B2 | 6/2014 | De Aguiar et al. |
| 8,786,610 B1 | 7/2014 | Pighin et al. |
| 8,797,328 B2 | 8/2014 | Corazza et al. |
| 8,854,376 B1 | 10/2014 | Bhat et al. |
| 8,860,731 B1 | 10/2014 | Cohen Bengio et al. |
| 8,913,839 B2 | 12/2014 | Ricanek, Jr. et al. |
| 8,928,672 B2 | 1/2015 | Corazza et al. |
| 8,928,674 B1 | 1/2015 | Sullican et al. |
| 8,941,665 B1 | 1/2015 | Sullivan et al. |
| 8,982,122 B2 | 3/2015 | Corazza et al. |
| 8,988,435 B1 | 3/2015 | Cohen Bengio |
| 9,001,132 B1 | 4/2015 | Bhat et al. |
| 9,123,175 B1 | 9/2015 | Goldenthal et al. |
| 9,142,055 B1 | 9/2015 | Bhat et al. |
| 9,165,393 B1 | 10/2015 | Low et al. |
| 9,183,660 B2 | 11/2015 | Koperwas et al. |
| 9,196,074 B1 | 11/2015 | Bhat et al. |
| 9,256,973 B2 | 2/2016 | Koperwas et al. |
| 9,317,740 B2 | 4/2016 | Ricanek, Jr. et al. |
| 9,317,954 B2 | 4/2016 | Li et al. |
| 9,342,912 B1 | 5/2016 | Pighin et al. |
| 9,508,178 B2 | 11/2016 | Jutan et al. |
| 9,508,179 B2 | 11/2016 | Jutan et al. |
| 9,600,742 B2 | 3/2017 | Yu et al. |
| 9,626,788 B2 | 4/2017 | Corazza et al. |
| 9,721,385 B2 | 8/2017 | Herman |
| 9,747,495 B2 | 8/2017 | Corazza et al. |
| 9,786,084 B1 | 10/2017 | Bhat et al. |
| 9,792,479 B2 | 10/2017 | Mallet et al. |
| 9,898,849 B2 | 2/2018 | Du et al. |
| 9,916,538 B2 | 3/2018 | Zadeh et al. |
| 2002/0050988 A1 | 5/2002 | Petrov et al. |
| 2003/0164829 A1 | 9/2003 | Bregler et al. |
| 2003/0169907 A1 | 9/2003 | Edwards et al. |
| 2003/0208116 A1 | 11/2003 | Liang et al. |
| 2003/0215130 A1 | 11/2003 | Nakamura et al. |
| 2004/0021660 A1 | 2/2004 | Ng-Thow-Hing et al. |
| 2004/0049309 A1 | 3/2004 | Gardner et al. |
| 2004/0210427 A1 | 10/2004 | Marschner et al. |
| 2004/0218894 A1 | 11/2004 | Harville et al. |
| 2004/0227752 A1 | 11/2004 | McCartha et al. |
| 2005/0062739 A1 | 3/2005 | Balmelli et al. |
| 2005/0264572 A1 | 12/2005 | Anast et al. |
| 2006/0002631 A1 | 1/2006 | Fu et al. |
| 2006/0109274 A1 | 5/2006 | Alvarez et al. |
| 2006/0126924 A1 | 6/2006 | Liu et al. |
| 2006/0134585 A1 | 6/2006 | Adamo-villani et al. |
| 2006/0171590 A1 | 8/2006 | Lu et al. |
| 2006/0228040 A1 | 10/2006 | Simon et al. |
| 2006/0245618 A1 | 11/2006 | Boregowda et al. |
| 2006/0267978 A1 | 11/2006 | Litke et al. |
| 2007/0091085 A1 | 4/2007 | Wang et al. |
| 2007/0104351 A1 | 5/2007 | Yang et al. |
| 2007/0167779 A1 | 7/2007 | Kim et al. |
| 2007/0182736 A1 | 8/2007 | Weaver |
| 2008/0002862 A1 | 1/2008 | Matsugu et al. |
| 2008/0024487 A1 | 1/2008 | Isner et al. |
| 2008/0030497 A1 | 2/2008 | Hu et al. |
| 2008/0031512 A1 | 2/2008 | Mundermann et al. |
| 2008/0043021 A1 | 2/2008 | Huang et al. |
| 2008/0152213 A1 | 6/2008 | Medioni et al. |
| 2008/0158224 A1 | 7/2008 | Wong et al. |
| 2008/0170077 A1 | 7/2008 | Sullivan et al. |
| 2008/0170078 A1 | 7/2008 | Sullivan et al. |
| 2008/0180448 A1 | 7/2008 | Anguelov et al. |
| 2008/0187213 A1 | 8/2008 | Zhang et al. |
| 2008/0187246 A1 | 8/2008 | Andres Del Valle |
| 2008/0252596 A1 | 10/2008 | Bell et al. |
| 2008/0284779 A1 | 11/2008 | Gu et al. |
| 2009/0027337 A1 | 1/2009 | Hildreth |
| 2009/0067730 A1 | 3/2009 | Schneiderman |
| 2009/0195544 A1 | 8/2009 | Wrinch |
| 2009/0196466 A1 | 8/2009 | Capata et al. |
| 2009/0196475 A1 | 8/2009 | Demirli et al. |
| 2009/0202114 A1 | 8/2009 | Morin et al. |
| 2009/0202144 A1 | 8/2009 | Taub et al. |
| 2009/0231347 A1 | 9/2009 | Omote |
| 2010/0007665 A1 | 1/2010 | Smith et al. |
| 2010/0020073 A1 | 1/2010 | Corazza et al. |
| 2010/0073361 A1 | 3/2010 | Taylor et al. |
| 2010/0134490 A1 | 6/2010 | Corazza et al. |

(56) References Cited

U.S. PATENT DOCUMENTS

| | | | |
|---|---|---|---|
| 2010/0141662 A1 | 6/2010 | Storey et al. |
| 2010/0149179 A1 | 6/2010 | Aguiar et al. |
| 2010/0203968 A1 | 8/2010 | Gill et al. |
| 2010/0235045 A1 | 9/2010 | Craig et al. |
| 2010/0238182 A1 | 9/2010 | Geisner et al. |
| 2010/0253703 A1 | 10/2010 | Ostermann |
| 2010/0259547 A1 | 10/2010 | de Aguiar et al. |
| 2010/0271366 A1 | 10/2010 | Sung et al. |
| 2010/0278405 A1 | 11/2010 | Kakadiaris et al. |
| 2010/0285877 A1 | 11/2010 | Corazza |
| 2011/0292034 A1 | 12/2011 | Corazza et al. |
| 2011/0296331 A1 | 12/2011 | Iyer et al. |
| 2011/0304622 A1 | 12/2011 | Rogers et al. |
| 2011/0304629 A1 | 12/2011 | Winchester et al. |
| 2012/0019517 A1 | 1/2012 | Corazza et al. |
| 2012/0038628 A1 | 2/2012 | Corazza et al. |
| 2012/0130717 A1 | 5/2012 | Xu et al. |
| 2012/0327091 A1 | 12/2012 | Eronen et al. |
| 2013/0021348 A1 | 1/2013 | Corazza et al. |
| 2013/0100140 A1 | 4/2013 | Ye et al. |
| 2013/0127853 A1 | 5/2013 | Corazza et al. |
| 2013/0215113 A1 | 8/2013 | Corazza et al. |
| 2013/0235045 A1 | 9/2013 | Corazza et al. |
| 2013/0257877 A1 | 10/2013 | Davis et al. |
| 2013/0271451 A1 | 10/2013 | Tong et al. |
| 2013/0311412 A1 | 11/2013 | Lazar et al. |
| 2014/0035934 A1 | 2/2014 | Du et al. |
| 2014/0043329 A1 | 2/2014 | Wang et al. |
| 2014/0160116 A1 | 6/2014 | de Aguiar et al. |
| 2014/0204084 A1 | 7/2014 | Corazza et al. |
| 2014/0285496 A1 | 9/2014 | de Aguiar et al. |
| 2014/0313192 A1 | 10/2014 | Corazza et al. |
| 2014/0313207 A1 | 10/2014 | Taylor et al. |
| 2015/0145859 A1 | 5/2015 | Corazza et al. |
| 2015/0193975 A1 | 7/2015 | Corazza et al. |
| 2015/0262405 A1 | 9/2015 | Black et al. |
| 2015/0358613 A1 | 12/2015 | Sandrew et al. |
| 2015/0363634 A1 | 12/2015 | Yin et al. |
| 2016/0328384 A1* | 11/2016 | Divakaran | G06F 17/2785 |
| 2017/0053663 A1 | 2/2017 | Yu et al. |
| 2017/0372505 A1 | 12/2017 | Bhat et al. |

FOREIGN PATENT DOCUMENTS

| | | |
|---|---|---|
| WO | 2007132451 A2 | 11/2007 |
| WO | 2009007701 A1 | 1/2009 |
| WO | 2010060113 A1 | 5/2010 |
| WO | 2010129721 A2 | 11/2010 |
| WO | 2010129721 A3 | 6/2011 |
| WO | 2011123802 A1 | 10/2011 |
| WO | 2012012753 A1 | 1/2012 |
| WO | 2017223530 A1 | 12/2017 |

OTHER PUBLICATIONS

International Search Report and Written Opinion for International Application No. PCT/US2009/057155, completed Dec 22, 2009, dated Jan. 12, 2010, 10 pgs.
International Search Report and Written Opinion for International Application No. PCT/US2009/065825, completed Jan. 21, 2010, dated Jan. 28, 2010, 9 pgs.
International Search Report and Written Opinion for International Application No. PCT/US2017/039136, Search completed Aug. 21, 2017, dated Sep. 5, 2017, 17 Pgs.
International Search Report and Written Opinion for International Application PCT/US2011/045060, completed Nov. 27, 2011, 6 pgs.
U.S. Appl. No. 14/222,390, Non-Final Office Action dated May 22, 2014, 66 pgs.
Allen at al., "The Space of Human Body Shapes: Reconstruction and Parameterization from Range Scans", ACM Transactions on Graphics, Jul. 2004, vol. 22, No. 3, 587-594.
Allen et al., "Articulated Body Deformation from Range Scan Data", ACM Transactions on Graphics, Jul. 21-26, 2002, vol. 21, No., pp. 612-619.
Anguelov et al., "Recovering Articulated Object Models from 3D Range Data", In Proceedings of the 20th Conference on Uncertainty in Artificial Intelligence, Jul. 7-11, 2004, pp. 18-26.
Anguelov et al., "SCAPE: Shape Completion and Animation of People", Printed Oct. 14, 2013, from www.robotics.stanford.edu/ !drago/projects/scape/scape.html, 1 pg.
Anguelov et al., "The Correlated Correspondence Algorithm for Unsupervised Registration of Nonrigid Surfaces", Advance in Neural Information Processing Systems, vol. 17, 8 pgs.
Baran, Llya S., "Using Rigging and Transfer to Animate 3D Characters", Thesis, Sep. 2010, 82 pgs.
Baran et al, "Automatic rigging and animation of 3D characters", ACM Transactions on Graphics (TOG)—Proceedings of ACM SIGGRAPH 2007, Jul. 2007, vol. 26, Issue 3, 8 pgs.
Beaudoin et al., "Adapting Wavelet Compression to Human Motion Capture Clips", Graphics Interface, May 28-30, 2007, pp. 313-318.
Blanz et al., "A Morphable Model for the Synthesis of 3D Faces", SIGGRAPH '99 Proceedings of the 26th Annual Conference on Computer Graphics and Interactive Techniques, Jul. 1, 1999, pp. 187-194.
Blanz et al., "Reanimating faces in images and video", EUROGRAPHICS, Sep. 2003, vol. 22, No. 3, 10 pgs.
Bray, "Markerless Based Human Motion Capture: A Survey", Published 2001, Televirtual Ltd., Norwich, UK, 44 pgs.
Buenaposada et al., "Performance Driven Facial Animation Using Illumination Independent Appearance-Based Tracking", Proceedings of ICPR, Hong Kong, Aug. 2006, 4 pgs.
Cheung et al., "Shape-from Silhouette of Articulated Objects and its use for Human Body Kinematics Estimation and Motion Capture", In Conference on Computer Vision and Pattern Recognition (CVPR), Jun. 18-20, 2003, 8 pgs.
Cootes et al., "Active appearance models", Proc. European Conference on Computer Vision, 1998, vol. 2, pp. 484-498.
Corazza, Stefano et al., U.S. Appl. No. 12/579,334, Notice of Allowance dated Feb. 7, 2014, 5 pgs.
Curio et al., "Semantic 3D Motion Retargeting for Facial Animation", ACM, Jul. 28, 2006, 8 pgs.
Curless et al., "A Volumetric Method of Building Complex Models from Range Images", Proceedings of SIGGRAPH, 1996, pp. 303-312.
Davis et al., "Filing Holes in Complex Surfaces Using Volumetric Diffusion", Symposium on 3D Data Processing, Visualization, and Transmission, Feb. 2002, 11 pgs.
De Aguiar et al., "Automatic Conversion of Mesh Animations into Skeleton-based Animations", EUROGRAPHICS, Apr. 24, 2008, vol. 27, No. 2, 9 pgs.
De Aguiar et al., "Marker-Less 3D Feature Tracking for Mesh-Based Human Motion Capture", Human Motion, Oct. 27, 2007, LNCS 4818, pp. 1-15.
Di Bernardo et al., "Generating Realistic Human Motions from Observations", submitted to Fifth European Conference on Computer Vision, ECCV 1998, pp. 1-12.
Gao et al., "Motion normalization: the preprocess of motion data", VRST '05, Nov. 7-9, 2005, pp. 253-256.
Garland et al., "Surface Simplification Using Quadric Error Metrics", Proceedings of SIGGRAPH, Aug. 3, 1997, 8 pgs.
Goncalves et al., "Reach Out and Touch Space (Motion Learning)", Proceedings, Third IEEE International Conference Apr. 14-16, 1998, 6 pgs.
Grassia, "Believable Automatically Synthesized Motion by Knowledge-Enhanced Motion Transformation", Thesis CMU-CS-00-163, Aug. 21, 2000, 215 pgs.
Grochow et al., "Style-Based Inverse Kinematics", ACM Transactions on Graphics, Aug. 1, 2004, vol. 23, No. 3, pp. 522-531.
Hahnel et al., "An Extension of the ICP Algorithm for Modeling Nonrigid Objects with Mobile Robots", Proceedings of the International Joint Conference on Artificial Intelligence (IJCAI), Aug. 9, 2003, 6 pgs.
He et al., "Deep residual learning for image recognition", arXiv:1512. 03385 [cs.CV], in 2016 IEEE Conference on Computer Vision and Pattern Recognition, Dec. 10, 2015, pp. 770-778.

(56) References Cited

OTHER PUBLICATIONS

Hilton et al., "From 3D Shape Capture to Animated Models", IEEE Computer Society, First International Symposium on 3D Processing, Visualization and Transmission (3DVPT2002), Jun. 19-21, 2002, 10 pgs.
Isidro et al., "Stochastic Refinement of the Visual Hull to Satisfy Photometric and Silhouette Consistency Constraints", Boston University Computer Science Tech. Report No. 2003-017, Jul. 31, 2003, Accepted to the Ninth International Conference on Computer Vision (ICCV 2003), 14 pgs.
Jones et al., "Fast multi-view face detection", Mitsubishi Electric Research Lab TR-20003-96, Aug. 2003, 11 pgs.
Ju et al., "Mean Value Coordinates for Closed Triangular Meshes", Proceedings of ACM SIGGRAPH, Jul. 31, 2005, 6 pgs.
Ju et al., "Reusable Skinning Templates Using Cage-based Deformations", ACM Transactions on Graphics (TOG)—Proceedings of ACM SIGGRAPH Asia 2008, vol. 27 Issue 5, 10 pgs., Dec. 2008.
Kahler et al., "Head Shop: Generating Animated Head Models with Anatomical Structure", ACM SIGGRAPH Symposium on Computer Animation, Jul. 21, 2002, pp. 55-64.
Kalogerakis, "Machine Learning Algorithms for Geometry Processing by Example", Thesis, 2010, 178 pgs.
Laine et al., "Production-Level Facial Performance Capture Using Deep Convolutional Neural Networks", arXiv:1609.06536 [cs.CV], Jun. 2, 2017, retrieved from https://arxiv.org/abs/1609.06536 on Jul. 20, 2017, 10 pages.
Lewis, "H.264/MPEG-4 AVC CABAC overview", printed Jun. 24, 2013 from http://www.web.archive.org/web/20121025003926/www.theonlineoasis.co.uk/notes.html, 3 pgs.
Lewis et al., "Pose Space Deformation: A Unified Approach to Shape Interpolation and Skeleton-Drive Deformation", Proceedings of ACM SIGGRAPH, Jul. 1, 2000, pp. 165-172.
Liepa, "Filing Holes in Meshes", Proc. of the Eurographics/ ACM SIGGRAPH Symposium on Geometry Processing, Jun. 23, 2003, 8 pgs.
Lin, M. et al., "Network in network", arXiv:1312.4400 [cs.NE], Dec. 18, 2013, 9 pages.
Liu et al., "3D Motion Retrieval with Motion Index Tree", Computer Vision and Image Understanding, Jun. 1, 2003, vol. 92, pp. 265-284.
Lum et al., "Combining Classifiers for Bone Fracture Detection in X-Ray Images", Image Processing, 2005. ICIP 2005. IEEE International Conference on (vol. 1) Date of Conference: Sep. 11-14, 2005, 4 pgs.
Ma et al., "An Invitation to 3D Vision", Springer Verlag, Chapter 2, 2004, pp. 15-28.
Mamou et al., "Temporal DCT-based compression of 3D dynamic meshes", ICCOM'06 Proceedings of the 10th WSEAS international conference on Communications, Jul. 10-12, 2006, 6 pgs.
Mamou et al., "The New MPEG-4/FAMC Standard for Animated 3D Mesh Compression", IEEE 3DTV-CON'08, May 28-30, 2008, pp. 97-100.
Mekhilef et al., "Automatic Face Recognition System", The Institution of Engineers, Malaysia vol. 69, No. 2; Publication, Jun. 2, 2008.
Mohr et al., "Building Efficient, Accurate Character Skins from Examples", ACM Transactions on Graphics, Jul. 27, 2003, vol. 22, No. 3, pp. 562-568.
Noh et al., "Expression Cloning", Proceedings of ACM SIGGRAPH, Aug. 12-17, 2001, published Aug. 1, 2001, 12 pgs.
Okada et al., "A Video Motion Capture System for Interactive Games", MVA2007 IAPR Conference on Machine Vision Applications, May 16-18, 2007, pp. 186-189.
Park et al., "On-line locomotion generation based on motion blending", ACM SIGGRAPH Symposium on Computer Animation, Jul. 21, 2002, pp. 105-111, 194.
Park et al., "On-line motion blending for real-time locomotion generation", Computer Animation & Virtual Worlds, Jun. 16, 2004, vol. 15, pp. 125-138.
Persson, "ExMS: an animated and avatar-based messaging system for expressive peer communication", GROUP '03, Nov. 9-12, 2003, pp. 31-39, published Nov. 9, 2003.
Safonova et al., "Construction and optimal search of interpolated motion graphs", ACM SIGGRAPH, Jul. 2007, vol. 26, Issue 3, Article 106, 11 pgs., published Aug. 8, 2007.
Sand et al., "Continuous Capture of Skin Deformation", ACM Transactions on Graphics, vol. 22, No. 3, pp. 578-586, Jul. 27, 2003.
Seitz et al., "A Comparison and Evaluation of Multi-View Stereo Reconstruction Algorithms", Computer Vision and Pattern Recognition, 2006 IEEE Computer Society Conference on. vol. 1. IEEE, Jun. 17, 2006, 8 pgs.
Seo et al., "An Automatic Modeling of Human Bodies from Sizing Parameters", In Symposium on Interactive 3D Graphics, Apr. 27, 2003, pp. 19-26.
Sloan et al., "Shape by Example", In 2001 Symposium on Interactive 3D Graphics, pp. 135-144, Mar. 1, 2001.
Smola et al., "A Tutorial on support Vector Regression", In Technical Report NC2-TR-1998-030, NeuroCOLT2, Oct. 1998, 73 pgs.
Smola et al., "A Tutorial on Support Vector Regression", Statistics and Computing, Aug. 1, 2004, vol. 14, Issue 3, pp. 199-222.
Sumner et al., "Deformation Transfer for Triangle Meshes", Proceedings of ACM SIGGRAPH 2004, 23(3), pp. 399-405, Aug. 8, 2004.
Szegedy et al., "Going deeper with convolutions", 2015 IEEE Conference on Computer Vision and Pattern Recognition (CVPR), Jun. 7-12, 2015, pp. 1-9.
Szliski et al., "Matching 3D Anatomical Surfaces with Non-rigid Deformations Using Octree-Splines", International Journal of Computer Vision, May 1, 1996, vol. 18, No. 22, pp. 171-186.
Taylor et al., "Modeling Human Motion Using Binary Latent Variables", Proc. of Advances in Neural Information Processing Systems (NIPS), 2007, vol. 19, 8 pgs.
Tena et al., "Interactive region-based linear 3d face models", ACM Transactions on Graphics (TOG), vol. 30, No. 4, ACM, Aug. 7, 2011, 9 pgs
Thies et al., "Face2Face: Real-time Face Capture and Reenactment of RGB Videos", 2016 IEEE Conference on Computer Vision and Pattern Recognition (CVPR), Jun. 27-30, 2016, pp. 2387-2395.
Trigeorgis et al., "Mnemonic descent method: A recurrent process applied for end-to-end face alignment", 2016 IEEE Conference on Computer Vision and Pattern Recognition (CVPR), Jun. 27-30, 2016, pp. 4177-4187.
Tung et al., "Topology Matching for 3D Video Compression", IEEE Conference Computer Vision and Pattern Recognition, Jun. 17-22, 2007, 8 pgs.
Vasilescu et al., "Multilinear Analysis of Image Ensembles: Tensorfaces", European Conference on Computer Vision (ECCV), pp. 447-460, first online Apr. 29, 2002.
Viola et al., "Fast multi-view face detection", Proc. of Computer Vision and Pattern Recognition, Jul. 15, 2003 8 pgs.
Viola et al., "Robust Real-time Object Detection", Cambridge Research Laboratory, Technical Report Series, Compaq, CRL 2001/01, Feb. 2001, Printed from: http://www.hpl.hp.com/techreports/Compaq-DEC/CRL-2001-1.pdf, 30 pgs.
Vlasic et al., "Face Transfer with Multilinear Models", ACM Transactions on Graphics 24(3), pp. 426-433, Jul. 31, 2005.
Vlasic et al., "Multilinear Models for Face Synthesis", SIGGRAPH Research Sketch, 2004, 1 pg.
Von Luxburg, "A Tutorial on Spectral Clustering. Statistics and Computing", arXiv:0711.0189, Nov. 1, 2007, pp. 1-32.
Wang et al., "Multi-weight Enveloping: Least Squares Approximation Techniques for Skin Animation", ACM SIGGRAPH Symposium on Computer Animation, pp. 129-138, Jul. 21, 2002.
Weise et al., "Face/off: Live facial puppetry", Proceedings of the 2009 ACM SIGGRAPH/Eurographics Symposium on Computer animation, Aug. 1, 2009, 10 pgs.
Weise et al., "Realtime performance-based facial animation", ACM Transactions on Graphics (TOG) 30.4, Aug. 7, 2011, Article No. 77, 9 pgs.
Wikipedia, Morph target animation, Last Modified Aug. 1, 2014, Retrieved from http://en.wikipedia.org/wiki/Morph_target_animation on Jan. 16, 2015, 3 pgs.

(56) References Cited

OTHER PUBLICATIONS

Xiao et al., "Control of motion in character animation", Proceedings of the Eighth International Conference on Information Visualization, IEEE Computer Society, Jul. 16, 2004, 8 pgs.
Zordan et al., "Dynamic Response for Motion Capture Animation", ACM Transactions on Graphics—Proceedings of ACM SIGGRAPH 2005, vol. 24, Issue 3, Jul. 31, 2005, pp. 697-701.
Written Opinion of the International Searching Authority for International Application No. PCT/US 09/57155, date completed Dec. 22, 2009, dated Jan. 12, 2010, 6 pgs.
Written Opinion of the International Searching Authority for International Application No. PCT/US 09/65825, date completed Jan. 21, 2010, dated Jan. 28, 2010, 6 pgs.
Blanz et al., "A Morphable Model for the Synthesis of 3D Faces", In Proceedings of ACM SIGGRAPH 1999, Jul. 1, 1999, 8 pgs.
Marsella et al., "Virtual Character Performance From Speech", Proceedings of the 12th ACM SIGGRAPH/Eurographics Symposium on Computer Animation. ACM, Jul. 19, 2013, 11 pgs.
Booth et al., "A 3d morphable model learnt from 10,000 faces", In Proceedings of the IEEE Conference on Computer Vision and Pattern Recognition 2016, pp. 5543-5552.
Salazar et al., "Fully automatic expression-invariant face correspondence", Machine Vision and Applications. May 1, 2014; 25(4), pp. 859-879.
Zulqarnain et al., "Shape-based automatic detection of a large number of 3D facial landmarks", In Proceedings of the IEEE conference on computer vision and pattern recognition 2015, pp. 4639-4648.

\* cited by examiner

SYSTEMS AND METHODS FOR ANIMATING MODELS FROM AUDIO DATA

CROSS REFERENCED APPLICATIONS

This Invention is a continuation of U.S. patent application Ser. No. 15/632,251 titled "Systems and Methods for Generating Computer Ready Animation Models of a Human Head from Captured Data Images" filed on Jun. 23, 2017 which claims priority to U.S. Provisional Patent Application 62/353,944 titled "Accurate 3D Animatable Facial Models for Human Faces from Photographs and Video" filed on Jun. 23, 2016 and U.S. Provisional Patent Application 62/367,233 titled "Systems and Methods for Providing an Animation Model of a Head from Captured Images" filed on Jul. 27, 2016. The content of both of these applications is hereby incorporated by reference as if set forth herewith.

FIELD OF THE INVENTION

This invention relates to generating a 3D avatar including a face based upon captured image data of a user's face. More particularly, this invention relates to animating the 3D avatar based upon received audio content.

BACKGROUND OF THE INVENTION

The creation of computer generated 3D content is becoming popular. Computer generated 3D content typically includes one or more animation controls. A 3D model of an object can be specified using a mesh of vertices and polygons that define the shape of the object in 3D. The 3D model can also have a texture applied to the mesh that defines the appearance of the mesh. 3D models used for animation can also include a rig that defines the articulated portions of the mesh and/or define the deformation of the mesh of the model as a function of the motion of the rig. The process of defining the rig is often referred to as rigging a 3D model. The animation of a rigged 3D model involves applying motion data to the model's rig to drive the model's mesh. The generation of animation can be technically challenging and is often performed by artists with specialized training.

SUMMARY OF THE INVENTION

Systems and/or method for generating computer ready animation models of a human head from captured data images in accordance with some embodiments of the invention are performed by one or more processes performed by one or more processors in the following manner. A captured image in which a face is visible is received and a customized static 3D model of a head from the captured image is generated by a 3D model generation process. The 3D model generation process determines a geometry component of the face visible in the captured image. Texture components of the face visible in the captured image are determined by the generation process. The process also determines lighting components of the face visible in the captured image and camera properties of the image. The geometry component, texture components, lighting components, and camera properties are applied to a generative model to generate a customized static 3D model of a head based on the image and the customized static 3D model is optimized using a gradient-based optimization framework by the process.

In accordance with some embodiments, the optimizing includes enforcing smoothness between neighboring vertices of customized 3D model during the optimizing of the customized static 3D model using a gradient-based optimization framework by regularization of terms. In accordance with many embodiments, a texture regularization term imposes a penalty for vertex color difference between neighboring vertices on a mesh of the customized 3D model and a shape regularization term imposes an edge-smoothness penalty for a deviation for undeformed edge lengths of the mesh.

In accordance with some embodiments, an additional captured image in which the face is visible is received and the customized static 3D model is optimized based upon the additional captured image.

In accordance with many embodiments, a segmentation process is performed to identify a hair region of the face in the captured image. In accordance with a number of embodiments, the segmentation process is performed by: projecting the captured image onto a determined geometry of the face to generate a 3D static model of the face, pixels of the face belonging to textured regions are identified, the pixels of the face are clustered by projected color, regions of pixels of the face that are skin identified, a hairline on the face is determined from the clustered pixels, and a facial boundary for the face is constructed based on the hairline. In accordance with a few embodiments, the segmentation process may also construct a hairline halo by expanding outward from the facial boundary and determine regions that image hair and that do not image hair in the hairline halo. In accordance with some particular embodiments, the hairline halo is constructed by performing a morphological dilation of a skin region of the face and differencing a dilated skin region with a non-skin region of the face. In accordance with some other particular embodiments, the hairline halo is constructed by performing an erosion of a non-skin region of the face and differencing an eroded non-skin region with a skin region of the face.

In accordance with some embodiments, empty portions of the customized static 3D model are filled. In accordance with many embodiments, the empty portions are filled by: generating a visibility mask indicating portions of the face represented in the captured image from the captured image and the determined geometry of the face, calculating a boundary of the visible region, smoothing a boundary curve of the visibility region, generating a new visibility mask, identifying each non-visible region of the face based upon the new visibility mask, determining a matching visible region of each of the identified non-visible regions, extrapolating a skin color for each visible region, determining an extrapolated skin color for each matching visible region, and filling in each non-visible region with the extrapolated skin color determined for a corresponding matching visible region. In accordance with several of embodiments, high frequency details to each of the filled-in non-visible regions of the image. In accordance with a few embodiments, the high frequency details are added using a Laplacian pyramid of a template texture.

In accordance with some embodiments, the one or more processes determine a position for each of a plurality of facial landmarks in the image by performing a Mnemonic Descent Method (MDM) using a Convolutional Neural Network (CNN) and a Recurrent Neural Network (RNN) that are jointly trained. In accordance with many of these embodiments, the determining of the position of each of a plurality of landmarks is performed by: aligning each of the landmarks at positions aligned to a center of the face in the image, and iteratively re-calculating the position of each of the plurality of landmarks until a threshold value is met. The re-calculating being performed by: obtaining a patch of pixels of a predetermined size surrounding the position of each of the plurality of landmarks, applying the patch for each of the plurality of descriptors to the CNN to generate an N length descriptor describing each patch, concatenating the N length descriptors of each patch to generate a descriptor encapsulating all of the patches, projecting the descriptor encapsulating all of the patches through the RNN to determine an adjustment amount for each of the plurality of landmarks, and updating the landmarks based on the current position of each of the plurality of landmarks and the adjustment amount of each of the plurality of landmarks. In accordance with some embodiments, the CNN includes a global average pooling after a final convolution layer of the CNN to obtain a fixed output size that is invariant with size of an input patch. In accordance with many embodiments, the CNN includes an additional convolutional layer that is not included in the global average pooling to retain spatial information.

In accordance with some embodiments, the one or more processes generate a customized rig for the customized static 3D model from the captured image. In accordance with many embodiments the customized rig is generated by receiving video images that include the face, fitting a model rig to blend shapes of the customized static 3D model, tracking a 3D surface of the face in the received videos, and re-computing the blend shapes of the face to best fit the tracked 3D surface of the face from the video images. In accordance with a number of embodiments, the tracking of the 3D surfaced is performed on a per pixel basis.

In accordance with some embodiments, the one or more processes receive video images synchronized to audio data, track a 3D surface of the face in the frames of the video images to generate a set of rig parameters for a portion of the video images, and map the set of rig parameters for each portion of the video images to a corresponding synchronized portion of the audio data. In accordance with many embodiments, the tracking of the 3D surface to at least one of generating the set of rig parameters and mapping to the audio data is performed using a temporal model including a recurrent neutral network. In accordance a number of embodiments, the tracking of the 3D surface to generate the set of rig parameters and the mapping to the audio data is performed using a time series model including a convolutional neural network.

In accordance with some embodiments, the one or more processes receive an input of audio data and generate an animation playlist from input audio data from the mapping of the sets rig parameters to corresponding synchronized portions of the audio data.

In accordance with some embodiments, a generative adversarial network is for at least one of mapping the set of rig parameters for each portion of the video images to a corresponding synchronized portion of the audio data and generating an animation playlist from input audio data from the mapping of the sets rig parameters to corresponding synchronized portions of the audio data.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
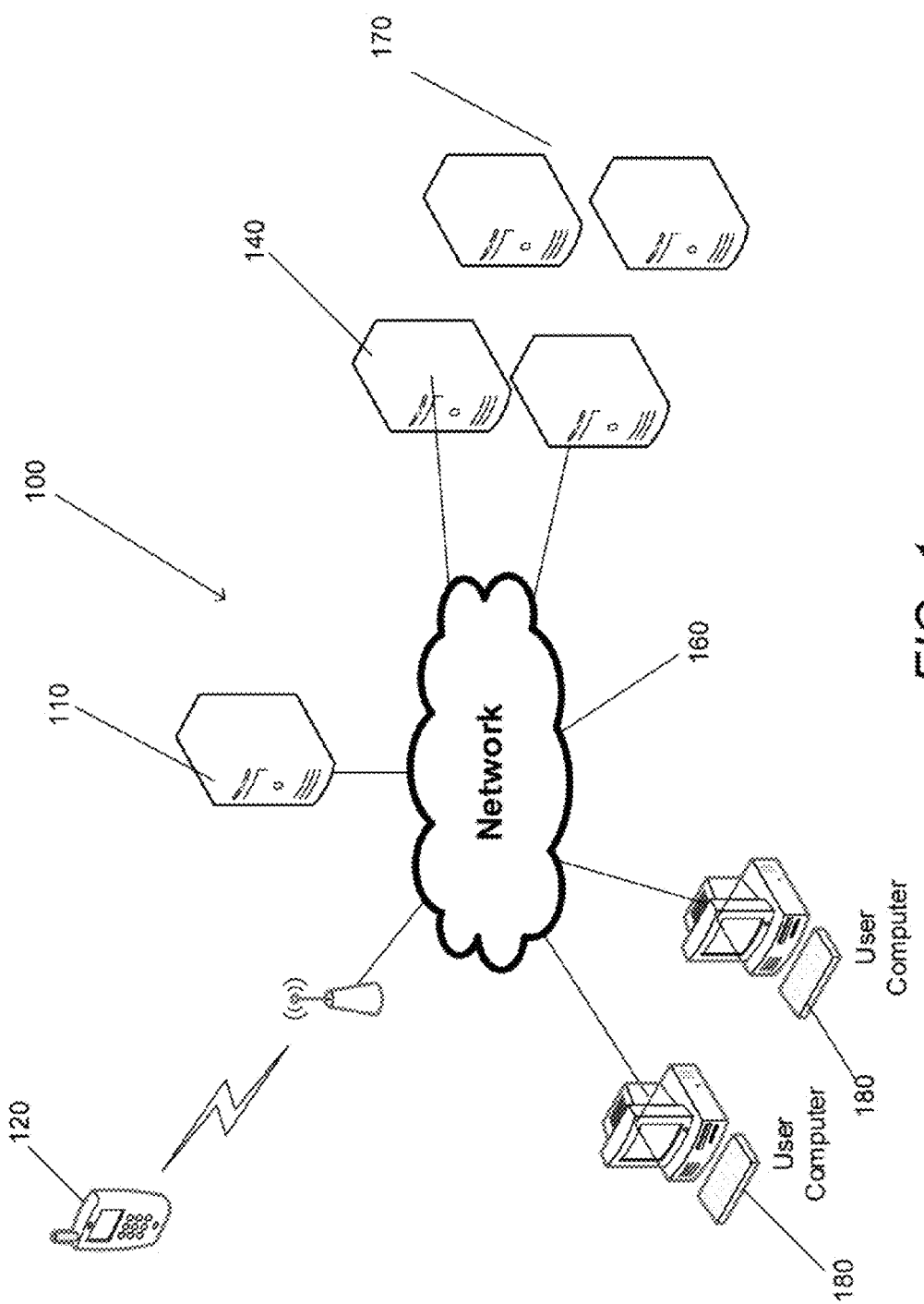
FIG. 1 illustrates a system for performing one or more processes to provide an animation-ready 3D model of a head in accordance with various embodiments of the invention.

Turning now to the drawings, systems and methods for generating animations of customized 3D models from received audio and/or video content in accordance with various embodiments of the invention are illustrated. Systems and processes in accordance with many embodiments of the invention provide a multi-scale multi-stage process for optimizing a customized 3D model and a rig and control curves for the rig to animate the customized 3D model. Systems in accordance with many embodiments of this invention can perform processes that can generate a static 3D model of a head from captured image data of the head and a customized rig for the 3D model. The term static 3D model typically refers to an unrigged 3D mesh. When the 3D mesh is rigged for animation, the 3D model can be referred to or animation ready. In several embodiments, the system can also animate the rigged or orientation-ready 3D model of the head mapping to rig parameters audio samples and/or video data. In accordance with the some other embodiments, the processes are performed by a "cloud" server system, a user device, and/or combination of devices local and/or remote from a user.

A process for generating a customized static 3D model of a head is performed in the following in manner in accordance with some embodiments. Image data including an image of a face is captured using an image capture device on a user device. In accordance with several of these embodiments, an application executed by the user device controls the image capture device to capture the image data. In accordance with many embodiments, the application determines whether the image of the face in the captured image meets certain criteria for further process and may require subsequent images to be captured until an image with a facial image that meets the criteria for further processing is captured. In a number of embodiments, the application may read the image from a memory of the user device. In many embodiments, the captured image is a 3D image capturing an image of a human face. In many embodiments, the captured image data includes depth measurements obtained from a depth sensor including (but not limited to) a time of flight camera and/or a structured light camera. In a number of embodiments, the image data includes images captured by multiple imagers captured using a plenoptic camera and/or images captured using a coded aperture from which depth information concerning distances to objects within a scene may be determined. The image data including the image of the face is transmitted to a server system for further processing in accordance with some embodiments. In many embodiments, the image is provided to a static 3D model generating process performed by the user device.

A static 3D model generating process in accordance with some embodiments of the invention generates a static 3D model of a face or head from the image data that includes an image of a face. In accordance with several embodiments, the process is performed by a server system that receives the captured image from an execution on a user device. In a number of embodiments, the process is performed by the user device that captured or received the data image. In some embodiments, the static 3D model generating process generates a static 3D model of a head from the image of the face in the captured image. In many embodiments, the process uses a generative animation model to model the face in the captured image. In accordance with embodiments, the generative animation model is based upon internal camera parameters, the shape of the face, the texture of the face and a translation vector.

To determine the texture of the face, the appearance of the face is factorized in accordance with some embodiments. In accordance with many embodiments, the appearance is factorized as a product of the skin albedo parameterized with a texture map and a low-frequency environmental lighting.

In accordance with some embodiments, a Lambertian reflectance model of the face is used to model the low-frequency lighting and the lighting is represented as a combination of point light sources and/or spherical harmonic sources.

The shape of the face can be parameterized using deformers in accordance with some embodiments of the invention. The deformers can include a blend shape deformer, a corrective deformer and/or a free-form deformer. A blend shape deformer can include blend shape vectors that may be pre-computed using PCA on a data set of several hundred static 3D facial models in accordance with some embodiments. In accordance with many embodiments, the Facial Action Coding System (FACS) blend shapes may be constructed by an artist using 3D modelling tools. In several embodiments, the FACS blend shapes may be synthesized using muscle-based physical simulation systems. In accordance with many embodiments, a mean dataset is used for each different ethnicity. A corrective deformer can be a rigid-as-possible deformer algorithm to model the corrective deformer. A free-form deformer can allow each vertex to deform independently in accordance with many embodiments.

The static 3D model of the head generated from the captured image can be optimized in accordance with any of a variety of appropriate optimization criteria. In accordance with many embodiments, the optimization is a gradient-based optimization. The optimized static 3D model can be stored in memory and/or provided to a software application for use. In accordance with some embodiments, an application executing on a user device receives the 3D static model from a server system that generated the model via a network.

In accordance with some embodiments, a rig is generated for the static 3D model. The rig can be generated by applying a standard set FACS blend shapes to a mesh of the static 3D model of the head. The motion of one or more landmarks and/or 3D shapes in visible video can be tracked and the blend shapes of the static 3D model video recomputed based on the tracked landmarks and/or to provide a customized rig for the 3D model.

In many embodiments, a process for determining rig parameters, which may also be referred to as control curves that can be used to animate a 3D model of a face in response to sounds in audio samples is performed. In several embodiments, the process receives video of a face captured while speaking sequence and synchronized audio segment of the user speaking to determine user specific facial movements performed during speech. In certain embodiments, the user is prompted to recite specific text to capture facial movements that can be generalized to all speech. In accordance with a number of embodiments, the input image may be compared to a 3D static geometry and surface retargeting performed on the 3D static geometry to generate a customized rig for the static 3D model. The process can track the shape position in each frame of video associated with a particular sound to determine the specific parameters (i.e., motion data) that can move the 3D model of the face in a similar motion to the face visible on the video sequence. The rig parameters associated with each particular sound can be stored and may be used to generate computer animations using the 3D model based on received audio and/or text.

In accordance with some embodiments, by one or more software applications, the 3D model is animated based on received audio and/or text in the following manner. An input containing audio content can be received. If the input is audio data, the audio is sampled at a specified rate and the sound in each sample can be determined. If the audio content is text, the sounds of the words in the text is can be determined and used. The rig parameters associated with the sound(s) in the sample can be determined from the stored mapping and added to a playback queue. The rig parameter for each of the sounds can be determined from the stored mappings and used for playback. In accordance with a number of embodiments, an input text may be received. Each word in the input text indicates a particular expression to be animated and a map of words to expressions can be used to obtain the set(s) of rig parameters to add to a playlist based upon the works.

The above and other features and advantages of systems and methods in accordance with various embodiments of the invention that can generate animation-ready 3D models of human faces and computer animation using the 3D models are discussed below.

Systems that Provide Animation of a 3D Model of a Head from Received Audio Data

A system that provides animation of a 3D model of a head from received audio data in accordance with some embodiments of the invention is shown in FIG. 1. Network 100 includes a communications network 160. The communications network 160 is a network such as the Internet that allows devices connected to the network 160 to communicate with other connected devices. Server systems 110, 140, and 170 are connected to the network 160. Each of the server systems 110, 140, and 170 is a group of one or more servers communicatively connected to one another via internal networks that execute processes that provide cloud services to users over the network 160. For purposes of this discussion, cloud services are one or more applications that are executed by one or more server systems to provide data and/or executable applications to devices over a network. The server systems 110, 140, and 170 are shown each having three servers in the internal network. However, the server systems 110, 140 and 170 may include any number of servers and any additional number of server systems may be connected to the network 160 to provide cloud services. In accordance with various embodiments of this invention, processes for generating a 3D model and animating the 3D model based upon audio data are provided by executing one or more processes on a single server system and/or a group of server systems communicating over network 160.

Users may use personal devices 180 and 120 that connect to the network 160 to perform processes for receiving, performing and/or interacting with a deep learning network that uses systems and methods that provide supervised learning systems in accordance with various embodiments of the invention. In the illustrated embodiment, the personal devices 180 are shown as desktop computers that are connected via a conventional "wired" connection to the network 160. However, the personal device 180 may be a desktop computer, a laptop computer, a smart television, an entertainment gaming console, or any other device that connects to the network 160 via a "wired" and/or "wireless" connection. The mobile device 120 connects to network 160 using a wireless connection. A wireless connection is a connection that uses Radio Frequency (RF) signals, Infrared signals, or any other form of wireless signaling to connect to the network 160. In FIG. 1, the mobile device 120 is a mobile telephone. However, mobile device 120 may be a mobile phone, Personal Digital Assistant (PDA), a tablet, a smartphone, or any other type of device that connects to network 160 via a wireless connection without departing from this invention. In accordance with some embodiments of the invention, the processes for generating a 3D model of a head and/or animating the 3D model based upon audio data are performed by the user device. In many embodiments, an application being executed by the user device may capture or obtain image data including a face image and transmit the captured image data to a server system that performs additional processing based upon the received image data.

Processing Systems

Figure 2:
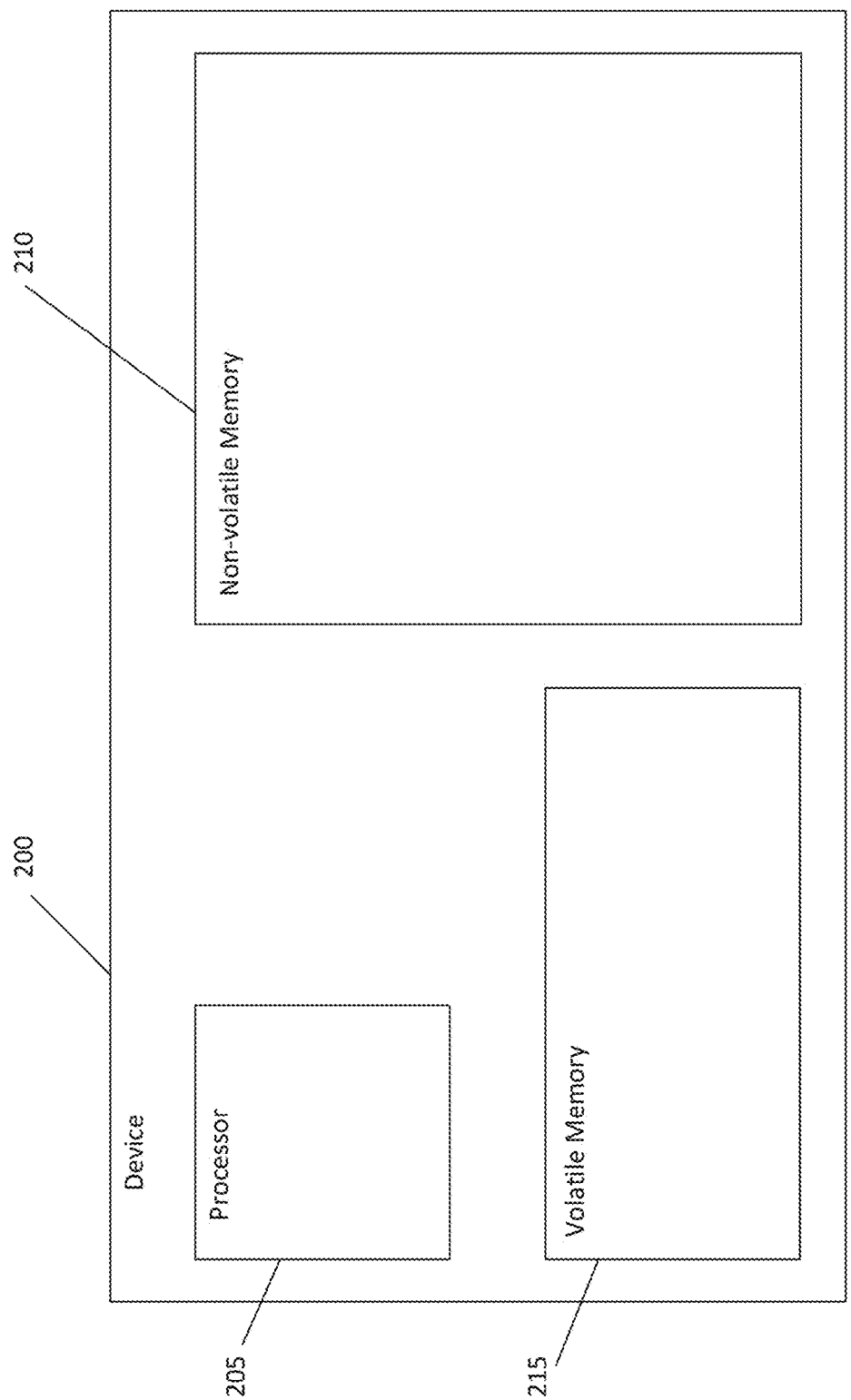
FIG. 2 illustrates components of a processing system in a device that executes one or more processes to provide an animation-ready 3D model of a head in accordance with various embodiments of the invention.

An example of a processing system in a device that executes instructions to perform processes that provide interaction with other devices connected to the network as shown in FIG. 1 and/or to provide animation of a 3D model of a face based upon received audio data in accordance with various embodiments of the invention is shown in FIG. 2. One skilled in the art will recognize that a particular processing system may include other components that are omitted for brevity without departing from this invention. The processing device 200 includes a processor 205, a non-volatile memory 210, and a volatile memory 215. The processor 205 is a processor, microprocessor, controller, or a combination of processors, microprocessor, and/or controllers that performs instructions stored in the volatile 215 or the non-volatile memory 210 to manipulate data stored in the memory. The non-volatile memory 210 can store the processor instructions utilized to configure the processing system 200 to perform processes including processes in accordance with certain embodiments of the invention and/or data for the processes being utilized. In other embodiments, the processing system software and/or firmware can be stored in any of a variety of non-transient computer readable media appropriate to the requirements of a specific application. A network interface is a device that allows processing system 200 to transmit and receive data over a network based upon the instructions performed by processor 205. Although a processing system 200 is illustrated in FIG. 2, any of a variety of processing systems can be utilized within one or more to perform processes similar to those described herein as appropriate to the requirements of specific applications in accordance with embodiments of the invention.

Generating and Animating 3D Models

In accordance with some embodiments of the invention, an animation-ready 3D model of a face is generated from image data containing at least a two-dimensional (2D) image of a face and the generated 3D model may be animated by input audio data. In accordance with some of these embodiments, the generated 3D model of the face is animated-ready mappings of generating specific sets of rig parameters based upon to samples of audio data, video data, and/or text data. In many embodiments, a user device executes an application that obtains a captured 2D image of a face and transmits the image to a server system that performs processes that generate an animation-ready 3D model and animate the generated model using mappings of sets of rig parameters. The user device (or another user device) can receive the 3D model and necessary mappings of sets of rig parameters from the server systems and can use this information to display computer animations. In several embodiments, the user device only receives the generated animation-ready 3D model from the server system. In a number of embodiments, the server system renders a video sequence based upon the computer animation and user devices receive the rendered video sequences for decoding and display. In certain embodiments, a user device sends audio data to a server system that uses the audio data to generate mappings in the form of a playlist of sets of rig parameters. The user device can receive the playlist and apply the playlist to the 3D model to generate an animation synchronized to the audio data that may be played back at the same time. In several embodiments, the user device may perform some or all of the processes for generating the animation-ready 3D model of the face and/or producing the mapping of sets of rig parameters to audio samples. Processes for generating animation-ready 3D model from a user provided data including at least a captured 2D image of a face, mappings of sets of rig parameters, the generated 3D models, and the generation of playlists of sets of rig parameters based on received audio content in accordance with various embodiments of the invention are discussed further below.

Generation of Static 3D Models of a Head from 2D Captured Images of Faces

In accordance with some embodiments of the invention, 3D static models of head can be generated from 2D captured images of faces. In many embodiments, a 2D image is captured by a user device. An application executing on the user device can capture a 2D image of a face. In a number of embodiments, the application may determine whether the image of the face in the captured 2D image meets certain criteria for generating an animation-ready 3D model of the head and may require additional images of the face to be captured until an image that meets the criteria for generation of a 3D model or additional data can be met. In a number of embodiments, the application may also obtain camera characteristics of the image captured device and/or image information including, but not limited to depth information to provide to animation and mapping processes for use in generating the animation 3D model and.

Figure 3:
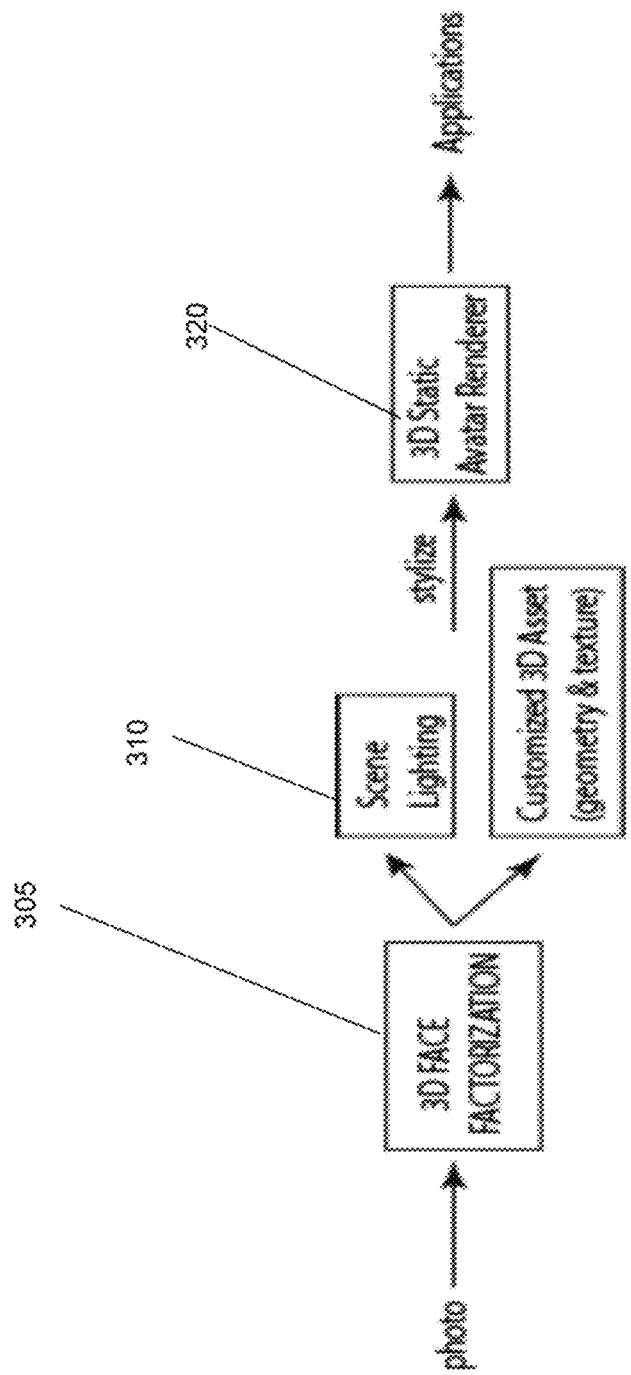
FIG. 3 is a conceptual diagram of a processing pipeline for generating a static 3D model of a head from a captured image of the head in accordance with an embodiment of the invention.

A captured 2D image containing an image of a face can be provided to an animation system. The animation system can generate a customized static 3D model of the face. A conceptual diagram of a processing pipeline for generating a customized static 3D model of a head from the captured 2D image of a face in accordance with an embodiment of the invention is shown in FIG. 3. As can readily be appreciated, the customized static 3D model for a head can be integrated into a larger 3D model such as, but not limited to, a complete 3D model for an avatar. In processing pipeline 300, a captured 2D image containing image data of a face is provided to a 3D face factorization process 305 that provides a 3D factorization of the face. The 3D factorization of the face can be used to determine scene lighting factors 310 from the image and a customized 3D asset 315 that includes, but is not limited to, a texture and geometry of the face. In accordance with a number of embodiments, the customized 3D asset may also include other information useful for animation of a 3D model and/or for altering the look of the generated 3D model. The information provided may include, but is not limited to, hair identification, skin tone information and other identified facial features and/or accessories (e.g. facial hair, glasses). The texture and geometry of the face, in turn, can be stylized to generate a customized 3D model 320 of a head that has features of the face in the captured 2D image that may be used in various applications including, but not limited to, generation of an animation-ready 3D model and/or the generation of a 3D avatar that incorporates features of the face in the captured 2D image. Although, a specific processing pipeline is described with reference to FIG. 3, other processing pipelines for generation of a customized static 3D models from 2D captured images of faces may be used in accordance with some other embodiments without departing from this invention including, but not limited to, processes that utilize captured depth information and/or synthesized depth information to better capture the shape of the face visible within the 2D images.

Figure 4:
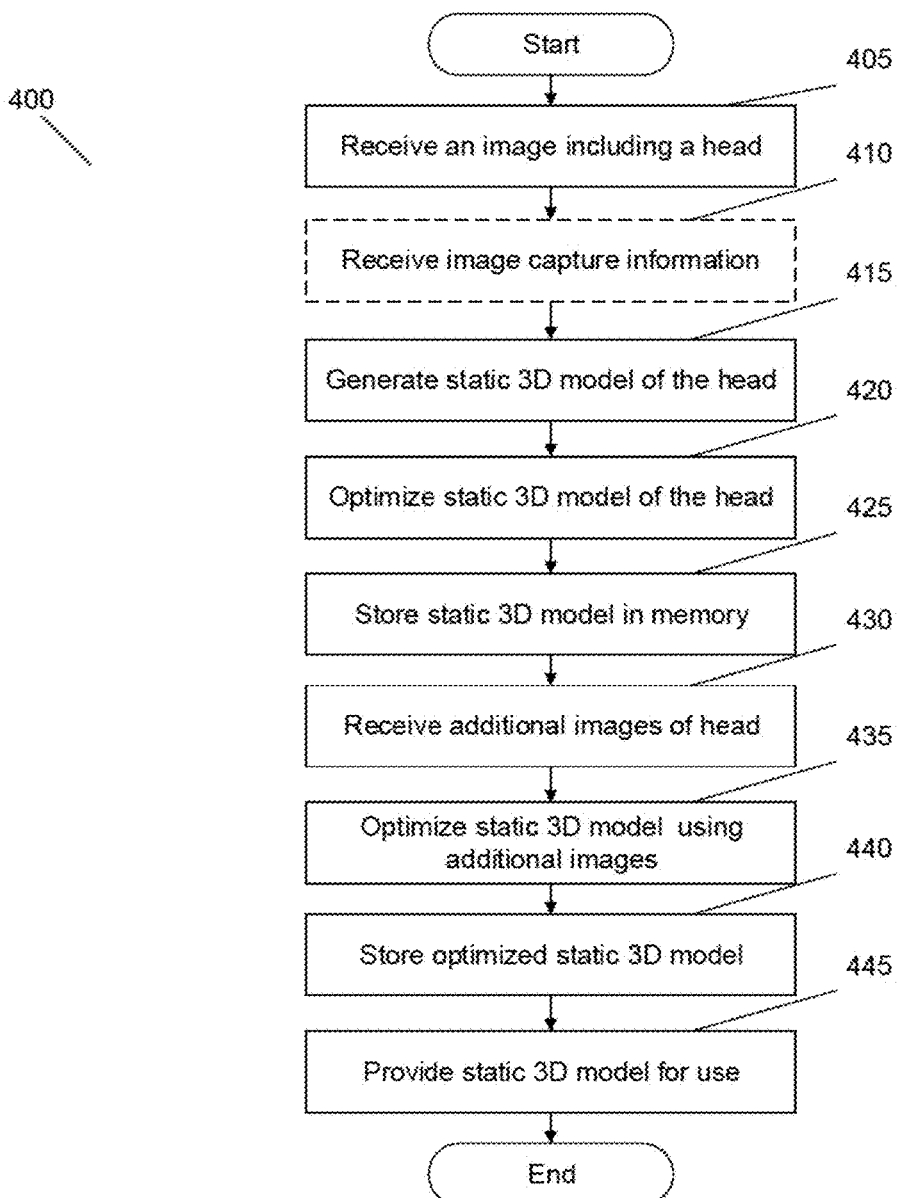
FIG. 4 illustrates a flow chart of a process for generating a static 3D model of a head from a captured image of the head in accordance with an embodiment of the invention.

A process that generates a customized 3D model from a 2D captured image including an image of a face that uses a processing pipeline shown in FIG. 3 in accordance with an embodiment of the invention is shown in FIG. 4. Process 400 includes receiving a 2D image that includes an image of a face (405). In accordance with some embodiments, the image is read from memory. In accordance with some other embodiments, the image may be received from another device via a communication network. Optionally, image capture information such as depth information, focal length and/or other camera information may be received (410) with the captured image. In several embodiments, the make and/or model of the image capture device is received and used to look-up camera parameters stored in a table or other data structure in memory.

Figure 11:
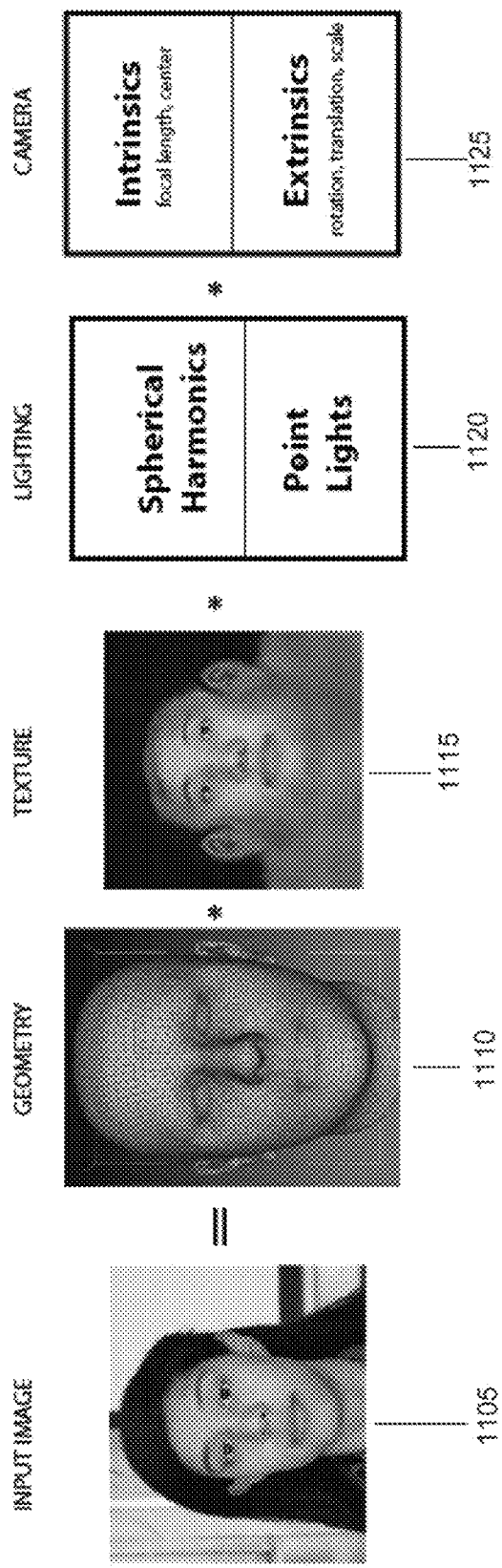
FIG. 11 illustrates various components used to generate an animation-ready 3D model of a human head in accordance with an embodiment of the invention.

A customized static 3D model of a head based on the face image in the 2D captured image and possibly the image capture information, if the information is available, is generated (415). In accordance with some embodiments, the captured images are divided into various components to generate a static 3D model of the head from the image of the face. Various components of a 2D image used to generate 3D model of a head in accordance with some embodiments of the invention are shown in FIG. 11. In the illustrated embodiment, the image 1105 is divided into a geometry or shape component of the face 1110, a texture of the face 1115, lighting components of the image 1120, and camera properties 1125. In other embodiments, any of a variety of components can be identified and used in the generation of a 3D model as appropriate to the requirements of a given application.

Returning to FIG. 4, a customized static 3D model can be generated in the following manner in accordance with some embodiments of the invention. The face in the image can be modeled using the following generative model:

$$I_g = \Pi(R \times G + t)$$

where $\Pi$ is a 3×3 matrix of camera internal parameters including, but not limited to, focal length and center of projection; R is a three-parameter rotation matrix, G is matrix representing of the geometry of the face, and t is a three parameter translation vector.

In accordance with some embodiments, $\Pi$ is derived from the rowed image capture information. In many embodiments, the received image capture information and/or an assumed model of the image capture device that captured the image can be used to generate $\Pi$. In several embodiments, a pinhole projection model of a camera is used to generate $\Pi$.

In a number of embodiments, G is factorized into two components (the shape and appearance) as expressed in the following equation:

$$G(\overline{\alpha}, \overline{\omega}, \overline{v}) = S(\overline{\alpha}, \overline{v}) \times A(\overline{\omega}, \overline{v})$$

where $S(\overline{\alpha}, \overline{v})$, is a parametric model of the shape of the face and $A(\overline{\omega}, \overline{v})$ is an appearance model of the face. In many embodiments, $\overline{v}$ is the vectors of vertex positions of a mesh for the face.

In accordance with some embodiments, the shape model, $S(\overline{\alpha}, \overline{v})$, is parameterized using a combinations of deformers in accordance with the following equation:

$$S(\overline{\alpha}, \overline{v}) = B(\overline{\alpha}_{blend}) \times C(\overline{\alpha}_{corr}) \times F(\overline{v})$$

where $B(\overline{\alpha}_{blend})$ is a blend shape deformer, $C(\overline{\alpha}_{corr})$ is a corrective deformer, and $F(\overline{v})$ is a free-form deformer.

In accordance with some embodiments, the blend shape deformer computes the shape as a linear combination of basis vectors with blending weights, $\alpha_{blend}$. In accordance with some embodiments, the blend shape vectors are pre-computed using PCA on a dataset of static 3D models of faces from multiple subjects. The blend shape deformer can include blend shape vectors that are pre-computed using PCA on a data set of several hundred static 3D facial models in accordance with some embodiments. In several embodiments, the FACS blend shapes may be constructed by an artist using 3D modelling tools. In many embodiments, the FACS blend shapes may be synthesized using muscle-based physical simulation systems. One skilled in the art will appreciate the greater the number subjects, the better the computation of the blend shape vectors. In accordance with a number of embodiments, the dataset may be initialized with a mean dataset for a specific ethnicity. An as-rigid-as-possible deformer algorithm can be used to model the corrective deformer in accordance with some embodiments. The free-form deformer can allow each vertex to deform independently in accordance with some embodiments.

In many embodiments, the appearance model, $A(\overline{\omega}, \overline{v})$, is a product of skin albedo parameterized with a texture map, T, and low-frequency lighting model, L, where a Lambertian reflectance model for the faces is assumed in accordance with the following equations:

$$A(\overline{\omega}, \overline{v}) = T(\omega_{tex}, \overline{v}) \times L(\omega_{light}, \overline{v})$$

$$L(\omega_{light}, \overline{v}) = S(\omega_{spherical}, \overline{v}) * P(\omega_{point}, \overline{v})$$

where $S(\omega_{spherical}, \overline{v})$ represents spherical light sources and $P(\omega_{point}, \overline{v})$ represents point light sources.

The customized static 3D model can be optimized (420). In accordance with some embodiments, the optimization can be performed using a gradient-based optimization framework applied to the generative model based on the following equation:

$$\overline{\alpha}, \overline{\omega}, \overline{v}^{arg\ min} \| E_{data} + \beta_{shape} \times E_{reg}^{shape} + \beta_{tex} \times E_{reg}^{texture} \|_2^2$$

where the data term, $E_{data}$, measures the dissimilarity between the image produced by the generative model and the source image, $I_{src}$. $E_{data}$ includes two terms one for the difference in image colors, $E_{data}^{color}$, and a second for the difference in primary contours, $E_{data}^{edge}$. Examples of contours include, but are not limited to eye contours, lip contours, nostrils, eyebrows, and overall silhouette. The two data terms can be expressed in the following equations:

$$E_{data}^{color} = I_g - I_{src}$$

$$E_{data}^{edge} = \nabla I_g - \nabla I_{src}$$

In accordance with some embodiments of the invention, one feature of the data term formulation is that correspondence between points on the generative model and the source images can change over the course of optimization. The regularization of terms can enforce smoothness between neighboring vertices. The texture regularization term can impose a penalty for vertex color differences between neighboring vertices on the mesh and the shape regularization term can impose an edge-smoothness penalty for any deviation for the undeformed edge lengths of the mesh.

In accordance with a number of embodiments, the generation and/or optimization of the customized 3D model is performed in stages. In accordance with many of these embodiments, a first stage can solve for the camera properties. The camera properties may include, but are not limited to, camera rotation, camera translation, Field of View (FOV), and focal length. In a second stage, the blendshape weights may be solved. In a third stage, a free-form deformation of the model is solved. In a fourth stage, the texture and light and lighting components may be solved. Finally, in a fifth stage, eye details are solved. In accordance with some embodiments, the eye details may include, but are not limited to, iris shape and eyelid folds. In accordance with a number of embodiments, different resolution meshes may be used in the different stages of the optimization process. In accordance some particular embodiments, a low-resolution mesh may be used for the first three stages and a high-resolution mesh is used in the fourth and fifth stages. In accordance with many particular embodiments, a transfer process is performed to transform the lower resolution mesh to a high-resolution mesh between the various stages.

Although, an optimizing process in accordance with the illustrated embodiment is described above, other optimizing processes in accordance with other embodiments of the invention may be used depending on the requirements of the particular system implemented.

Returning to FIG. 4, the generated customized 3D static model can be stored in a memory for use (425). Optionally, process 400 may receive one or more additional images that include the face image (430). The customized static 3D model of the head can be optimized using each of the one or more additional images in the manner described above and/or in accordance with any of a variety of best fit criteria appropriate to the requirements of a given application (435). The optimized static 3D model can be stored in memory for future use. In addition, the 3D static model may be provided to other applications for use. In accordance with some embodiments, the customized 3D model may be transmitted to an application on a user device via a communications network or may be provided to another application executing on the same device.

Although various processes for generating static 3D models of heads from captured images that include images of faces are discussed above with reference to FIG. 4, other generation processes that add, omit, and/or combine steps may be performed in accordance with other embodiments of the invention.

Other Processes for Generating Information for Customized 3D Assets

Processing pipelines generate customized 3D assets that may include geometry texture information for a face as well as other information utilized within the computer animation systems in accordance with the various embodiments that may be useful for altering the customized static 3D model, animating the customized 3D model, and/or other applications use the customized static 3D models. In some embodiments, a factorization process is utilized that involves reforming processes that generate the information used in 3D segmentation. These processes may include (but are not limited to) a segmentation process, a hole filling process, a facial landmark identification process, an iris geometry determining process and an iris color information process are described in more detail below.

Segmentation Process

Figure 12:
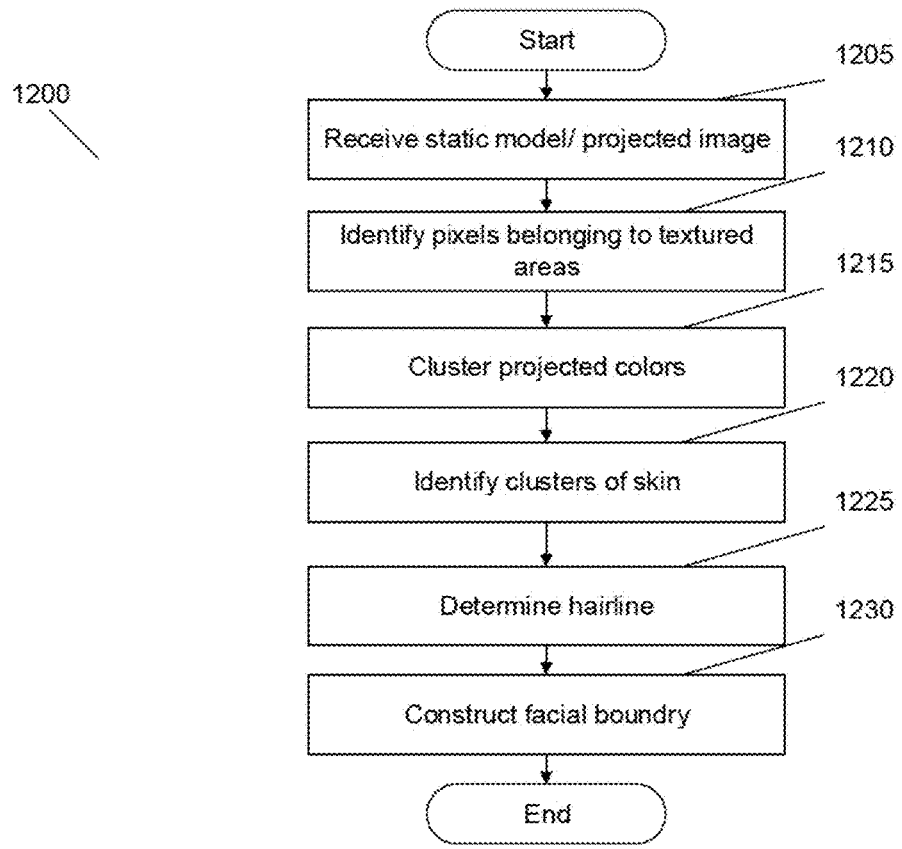
FIG. 12 illustrates a flow diagram of a process for performing segmentation to identify a hair portion of a facial image in accordance with an embodiment of the invention.

Processes for identifying features of a head in an image may be used to provide useful information including, but not limited to, an estimation of a color spectrum, an estimation of a hairstyle visible within the image, an estimation of skin tone, and/or a determination of skin texture. A segmentation process that detects facial features in accordance with the many embodiments of the invention labels pixels in an image of a face according to a determination of specific pixels related to each facial feature that are visible with the image. Examples of features that may be represented by the pixels include, but are not limited to, skin, hair, eyes, mouth, and/or background. Although there are many conventional segmentation processes for features in images, a segmentation process for facial images can encounter particular problems including, but not limited to, wisps of hair across an uncovered portion of a face, light variation across a face that can make portions of the skin appear dissimilar, and/or texture variation across a face. A segmentation process for identifying skin and hair regions of a face from a 3D model in accordance with an embodiment of the invention is shown in FIG. 12. In accordance with some embodiments, the segmentation process may be performed on the resulting customized 3D model. In several embodiments, the segmentation process may be performed as an intermediate step in the generation of a customized static 3D model.

Figure 13:
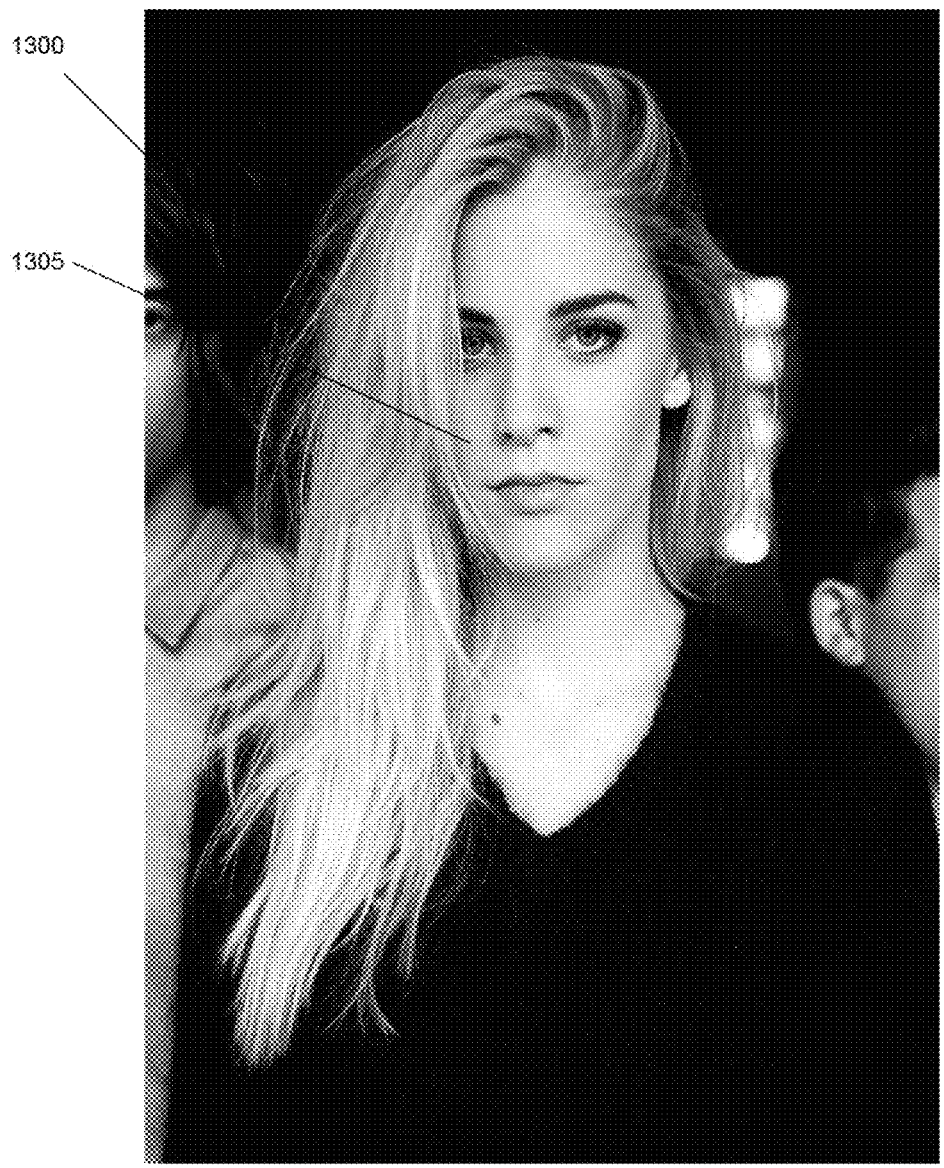
FIG. 13 is an example facial image upon which segmentation processing can be performed in accordance with an embodiment of the invention.
Figure 14:
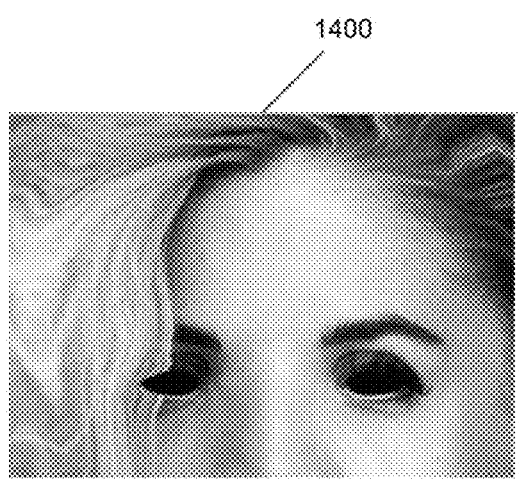
FIG. 14 is a cropped image of the facial image shown in FIG. 13 projected onto a determined geometry determined during segmentation processing in accordance with an embodiment of the invention.

In process 1200, a 3D projection of a head is obtained (1205). In several embodiments, the customized static 3D model generated by process 400 may be obtained and used to generate the projection. In a number of embodiments, the process receives the image of a face, estimates a geometry of a head from the image of the face, and projects the image of the face onto the estimated geometry to create a 3D static model. During the projection, pixels landing on a visible portion of the geometry are facial skin and hair; and the remaining pixels can be categorized as background pixels and eliminated. The projection can also place identified facial features at standardized locations on the model. An example of an input image is shown in FIG. 13 where image 1300 includes a face 1305. The face 1305 can be projected onto the determined geometry. A cropped image 1400 of the face 1305 from the image 1300 in FIG. 13 being projected onto the determined geometry in accordance with an embodiment of the invention is shown in FIG. 14.

Referring again to FIG. 12, the pixels of the 3D static model that belong to particular textured regions can be identified (1210). In several embodiments, edge detection and morphological filling processes can be used to identify the textured regions of the image. In accordance with many embodiments, one or more regions of skin containing regions are identified. The strip of skin across the bridge of the nose of the face beneath the eyes may be used in accordance with a number of embodiments. More than one region may be used in accordance with some embodiments to avoid the problem of hair covering the skin in one of the regions.

Figure 15:
FIG. 15 illustrates a mask of canny edges over the cropped image from FIG. 14 generated during segmentation processing in accordance with an embodiment of the invention.
Figure 16:
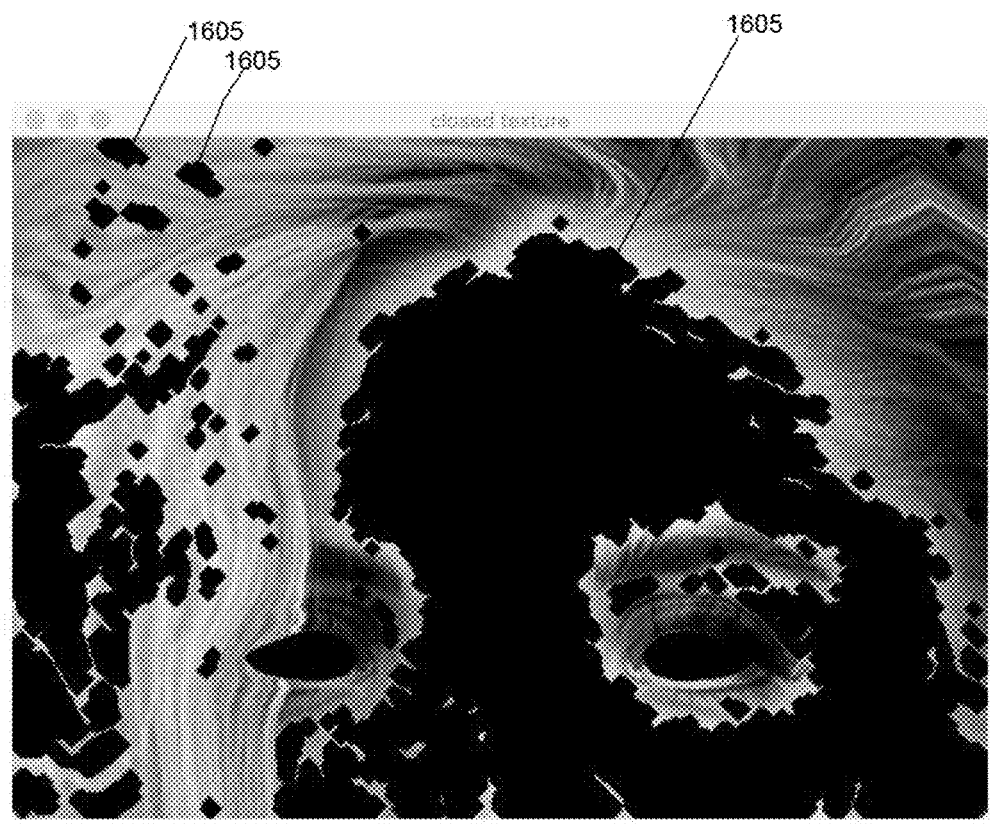
FIG. 16 is an image showing morphological close of the edges as a mask generated during a segmentation process shown over the cropped facial image in FIG. 14 in accordance with an embodiment of the invention.
Figure 17:
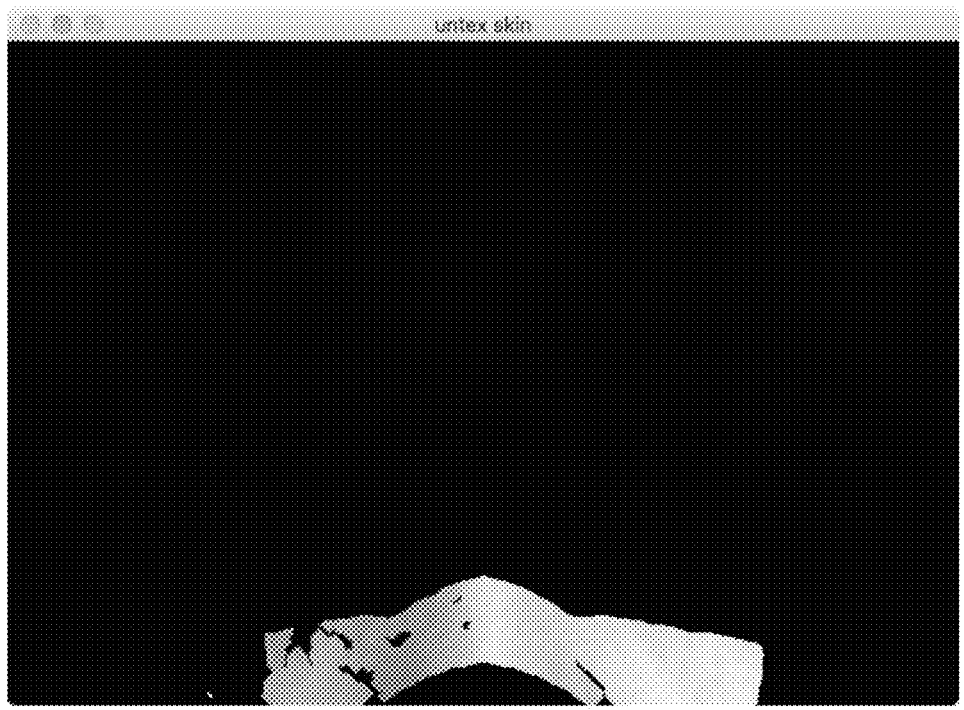
FIG. 17 is an image of a region of the facial image with texture removed as part of segmentation process performed in accordance with an embodiment of the invention.

Edges may be found and used as a proxy for texture in accordance with many embodiments. In accordance with a number of embodiments, edges may be determined by applying a Canny edge detector to the image to generate a mask. An image of Canny edges displayed over the example image 1300 as a mask is shown in FIG. 15. In the resulting mask, strands of hair will tend to produce edges separated by a textured region having a small number of pixels between edges (i.e., strands of hair). These textured regions can be filled by performing a morphological close process of a width comparable to the width of the separation between strands. The width may be determined using a training set of images in accordance with several embodiments. An image showing application of a morphological close of the edges as a mask over the example image 1300 is shown in FIG. 16 where regions 1605 are texture free. The process can reduce non-strand image noise by performing a morphological open of the same width to erase small islands within the region. The number of nonzero pixels in the skin regions can be counted and compared to a threshold. In accordance with some embodiments, the threshold can be determined from a training set of images. If the minimum region count is above the threshold, the detection process can be repeated with a greater level of blur to gradually reduce small-scale features and noise. This process can calibrate the texture detection to a level of detail in which skin is largely clear, while strands of hair continue to be detected. Thus, at the discovered level, very little texture will appear on the skin except where hair falls across the region. An example of a resulting mask is shown in FIG. 17. In FIG. 17, skin on either side of the nose has textured pixels removed.

In accordance with some embodiments of the invention, a clear skin patch can be used to estimate a range of skin tones in the image. The bridge of the nose can be used, because the position of this region generally captures a range of light levels and different skin shade and/or other embodiments, any of a variety of regions appropriate to the requirements of a give application is to be utilized. Furthermore, the determined textured areas are likely candidates for hair. However, these textured areas may include some skin that is removed in subsequent steps as discussed below.

Figure 18:
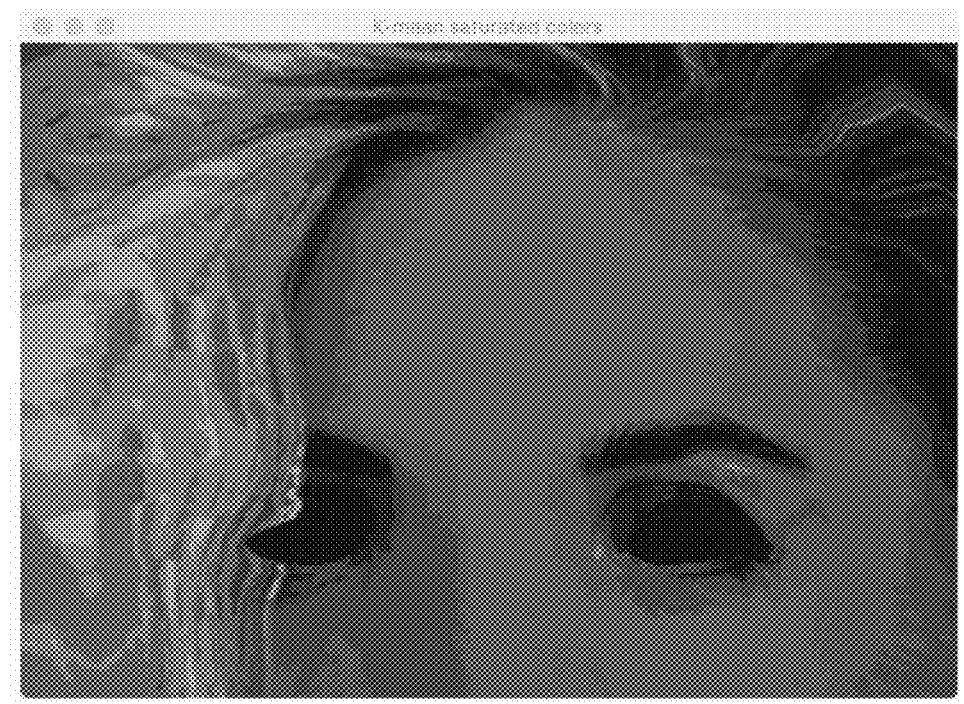
FIG. 18 is a resulting RGB image resulting from the conversion of a hue/saturation/value image of the cropped example facial image shown in FIG. 14 to a RGB image during segmentation processing in accordance with an embodiment of the invention.

Returning to FIG. 12, the pixels can be clustered by color (1215). In accordance with some embodiments, the clustering of the pixels is performed using a K-means or Median Shift algorithm operating on the RGB pixels of the image to partition the image into regions of similar color. 5 to 10 color bins can be used to partition the regions in accordance with a number of embodiments. In accordance with several embodiments, the color image can be converted into a hue/saturation/value image with the saturation channel written to 100%. The hue/saturation/value image can then be converted back to a RGB image. An example of the image that results when this process is applied to the cropped example image from FIG. 14 is shown in FIG. 18.

Figure 19:
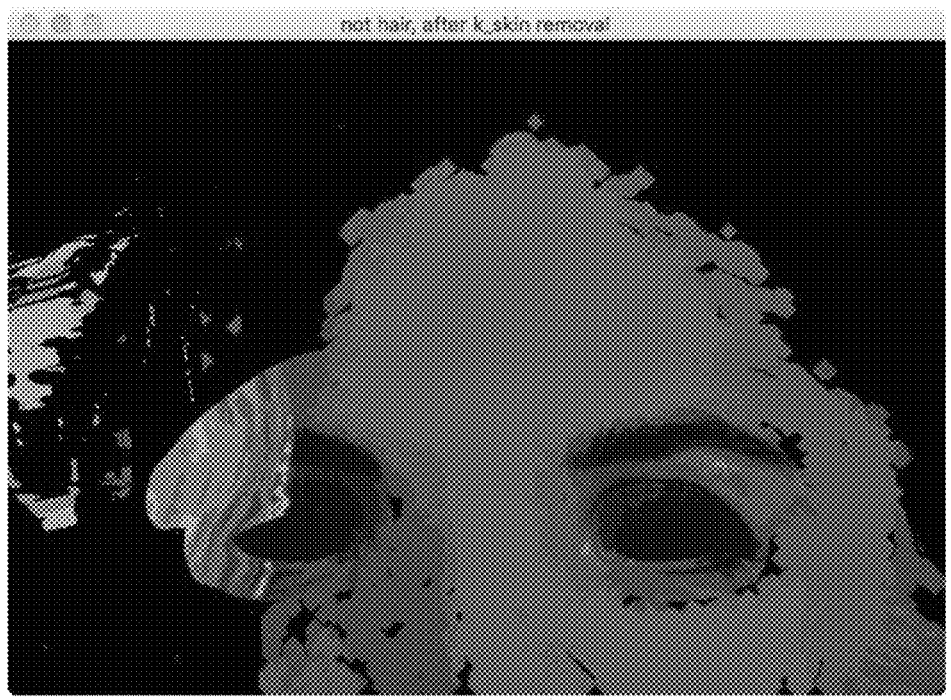
FIG. 19 is an image of regions of the image labelled as skin during segmentation processing of the example cropped facial image as shown in FIG. 14 in accordance with an embodiment of the invention.

The regions of skin are identified (1220) and texture pixels can be removed from the skin regions of the image leaving the pixels having varying color and illumination. These remaining pixels can be labeled as one or more categories of skin. An image of the skin in cropped example image from FIG. 14 after labeling is shown in FIG. 19. In FIG. 19, the skin is a colored area that is untextured and matches the color found in the skin patch. In the particular example in FIG. 19, a peculiar shape around the hair-covered left eye is from a 'raccoon mask' that removes the eye area from being labeled.

Figure 20:
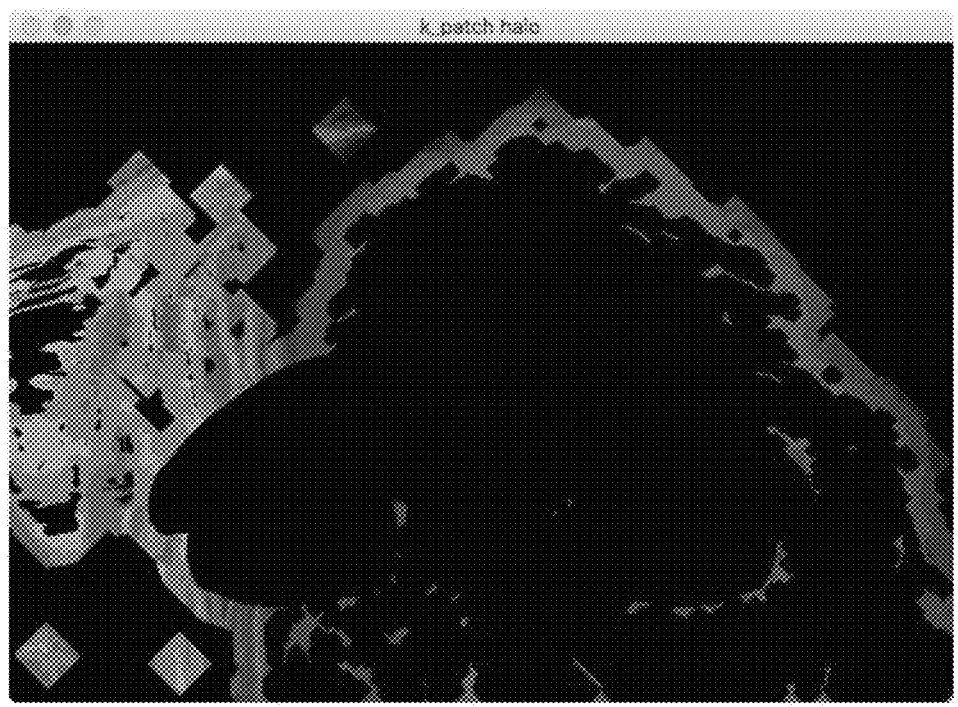
FIG. 20 is an image of a hairline halo of the example facial image shown in FIG. 14 in accordance with an embodiment of the invention.
Figure 21:
FIG. 21 is an image of the cropped example facial image shown in FIG. 14 resolved into hair and not hair based on the presence of texture during segmentation processing to create a halo in accordance with an embodiment of the invention.

Referring again to FIG. 12, the hairline can be determined from the clustered pixels (1225) and a facial boundary determined (1230). Typically, a strong texture is present at the transition from skin to hair along the hairline; and skin color labeled pixels are often present with near-skin color labeled pixels arising from shadowed skin at the hairline. To disambiguate the hair and skin at the hairline, a hairline halo may be constructed in accordance with many embodiments. The hairline halo may be constructed by expanding outward from the boundary of the skin labeled area(s). An image of a hairline halo for the cropped example image from FIG. 14 is shown in FIG. 20. In accordance with some embodiments, the expansion is completed by performing a morphological dilation of the skin area and differencing the dilated skin area with the non-skin area. Alternatively, an erosion of the non-skin area and differencing the eroded non-skin area with the skin area may be performed. In accordance with a number of these embodiments, the width of the dilation and/or erosion can be determined from a training set of images. Any nontextured pixels within the halo can be marked as skin and the textured pixels marked as hair. In accordance with several embodiments, the pixels marked non-textured pixels may be provided to classifiers and determined to be skin. An image of a halo region resolved into hair and not hair based on the presence of texture in accordance with an embodiment of the invention is shown in FIG. 21.

Although various segmentation processes for a head in a captured image are discussed above with reference to FIG. 12, other segmentation processes that add, omit, and/or combine steps may be performed in accordance with other embodiments of the invention depending on the exact requirements of the system.

Hole Filling Process

Figure 22:
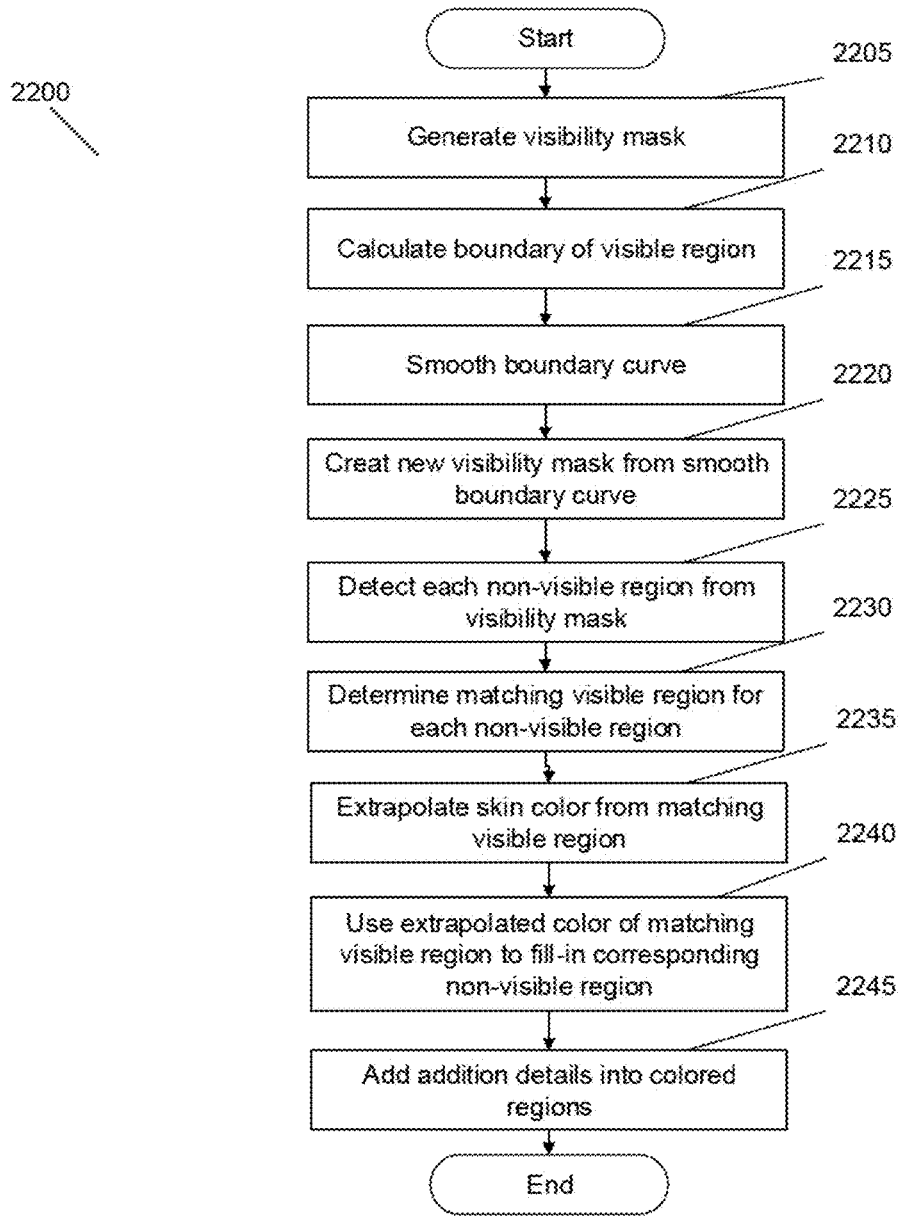
FIG. 22 illustrates a flow diagram of a hole filling process performed by one or more devices during the generation of a static 3D model in accordance with an embodiment of the invention.
Figure 23:
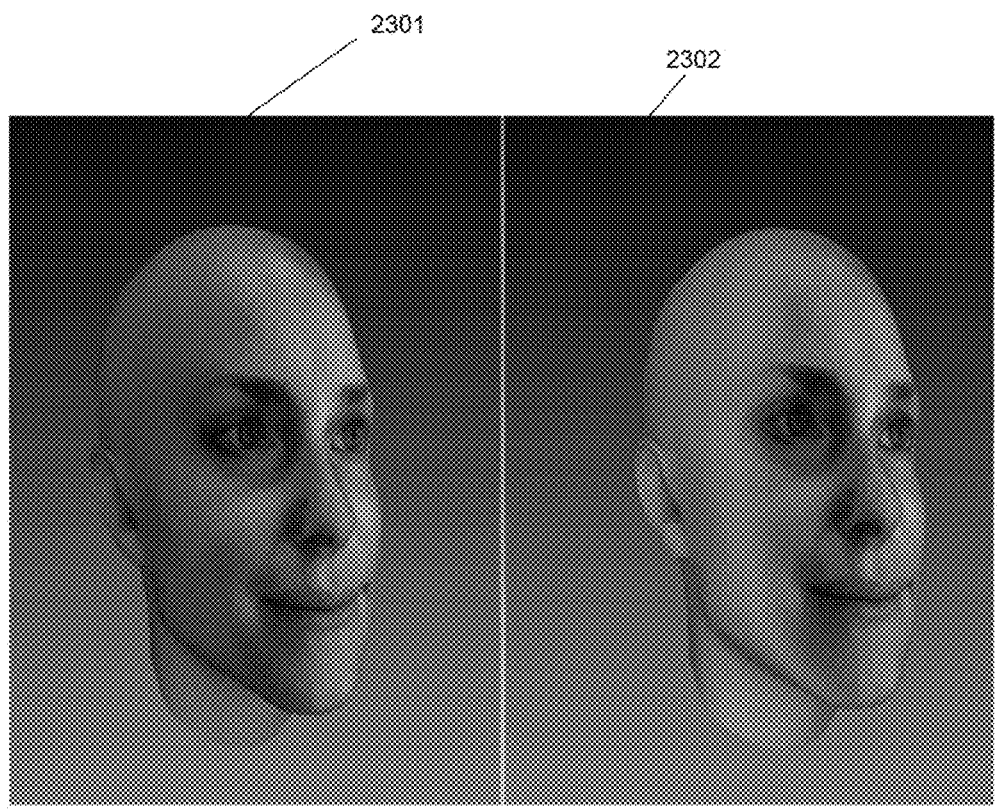
FIG. 23 illustrates a comparison between an image having a final texture solved with a single tone and an image having a determined skin tone with smooth variations generated by a hole filling process in accordance with an embodiment of the invention.

A problem in generated a 3D static model of a head from a captured image is occlusion in the image. Many features that a user would like to represent in a 3D model may be missing in a captured image due to occlusion in the image. Examples of features that may not be seen in the image of a face include, but are not limited to, the inside of a nostril, the back of an eyelid and a side of a cheek. To make a complete 3D static model of a head, these missing features can be "filled in" to allow the head to be viewed from any arbitrary viewpoint. To do so, processes in accordance to some embodiments of the invention perform a "filling" process to "fill in" holes left in the model. In order to "fill in" missing regions of the face, a skin tone for the region can. However, skin tone cannot simply consist include a single global tone that "fills in" the missing region. Instead, the determined skin tone ideally includes variations that exist in the original image caused by lighting/shadowing effects as well as the natural variation that occurs typically in a person's unique skin tone. The determined skin tone ideally also varies smoothly across the entire face to avoid creating jarring artifacts to a viewer when the final texture is projected to a 3D geometry to generate a 3D static model. A comparison between projecting an image 2301 having a final texture solved with a single tone and an image 2302 having a determined skin tone with smooth variations is shown in FIG. 23. A process for "filling in" missing regions of an image using variations of skin tone in accordance with an embodiment of the invention is shown in FIG. 22.

Figure 24:
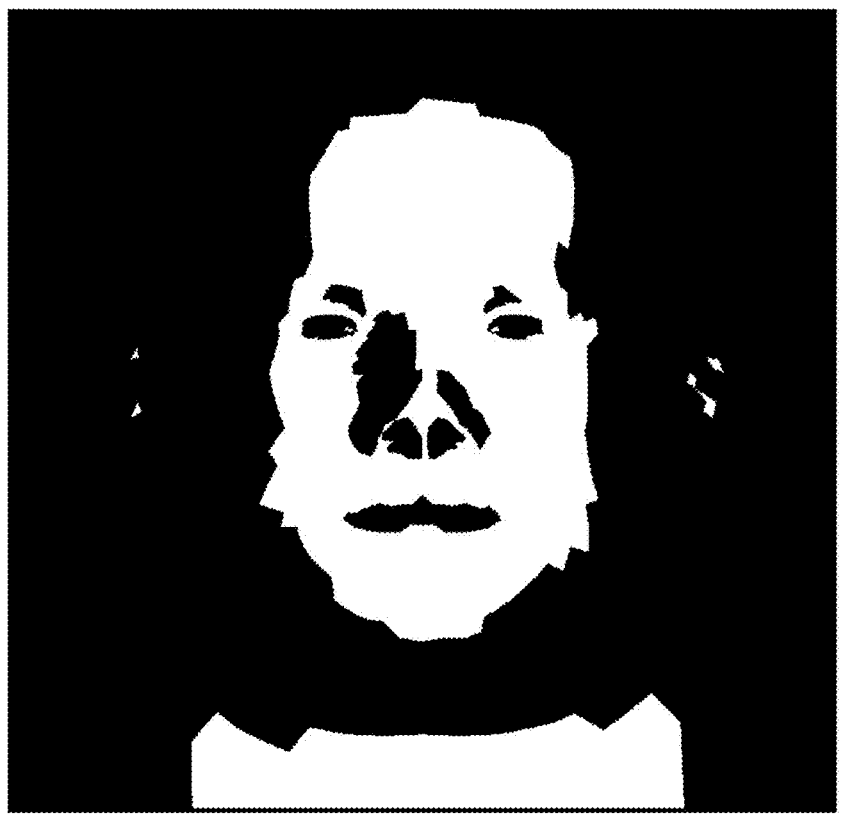
FIG. 24 is an image of a visibility mask generated during a hole filling process in accordance with an embodiment of the invention.

Process 2200 includes generating a visibility mask (2205). A visibility mask is a binary mask that determines regions in the image from which information may be borrowed. An image of a visibility mask in accordance with an embodiment of the invention is shown in FIG. 24. In visibility mask 2400, visible pixels are represented as white and regions of invisible pixels that can be synthesized are represented as black. The visibility mask can be computed using the following:

$$v(x_i) = \begin{cases} 1 & \text{if } C_d * n(x_i) \leq \frac{\pi}{3} \\ 0 & \text{otherwise} \end{cases}$$

where $v(x_i)$ computes the visibility of a vertex $x_i$, $C_d$ is the camera direction vector towards the solved 3D geometry, and $n(x_i)$ is the vertex normal at vertex $x_i$.

Figure 25:
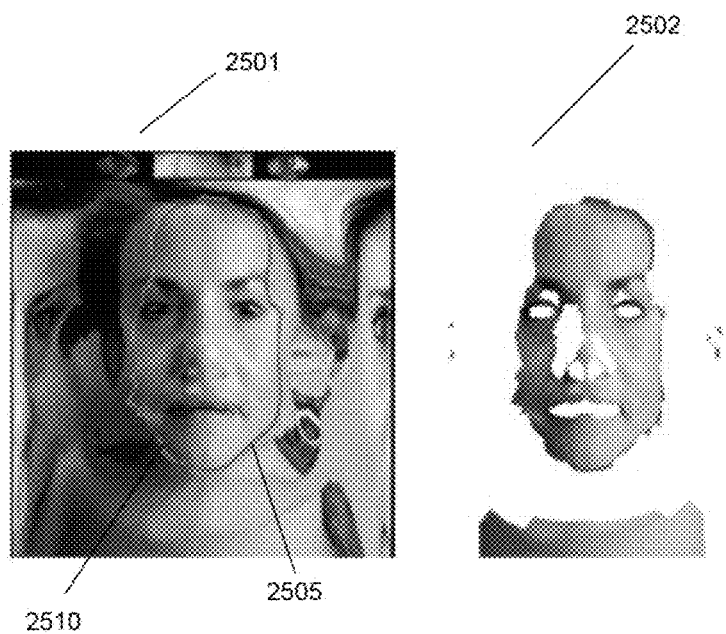
FIG. 25 conceptually illustrates a boundary of a visible region generated from a the visibility mask and a final smooth boundary determined during a hole filling process in accordance with an embodiment of the invention.

A boundary of a visible region in the image can be computed using the visibility mask (2210). The boundary can be smoothed (2215) to compute a final smooth boundary that encompasses a visible portion of the face. An image of the boundary of a visible region generated from the visibility mask and the final smooth boundary computed in accordance with an embodiment of the invention are shown in FIG. 25. In image 2501, green line 2505 shows the boundary determined from the visibility mask and red line 2510 shows the smoothed boundary. Image 2502 shows the visible texture superimposed over the visibility mask. The region within the boundary may still include holes that can be filled by a process similar to any of the processes described below.

A new visibility mask can be created from the final smooth boundary (2220). The new visibility is a mask that can be used to determine a valid region of the face texture projected on a 3D geometry to use to extrapolate skin color for other regions of the facial geometry.

The process 2200 can fill-in not-visible regions of the image. A non-visible region can be identified (2225). A valid visible region for use in filling in each non-visible region can be determined using the visibility mask (2230). The skin color of each valid visible region can be extrapolated (2235). In accordance with a number of embodiments, the extrapolation of skin colors may be performed by minimizing variation among the entire 3D geometry. In other embodiments, any of a variety of processes appropriate to be the requirements of a given application can be utilized to extrapolate skin color. In accordance with several embodiments, the problem is initialized such that:

$$C(x_i) = \begin{cases} P(x_i), & \text{if } m(x_i) > 0 \\ 0, & \text{otherwise} \end{cases}$$

where, $C(x_i)$ is the color for vertex $x_i$, $P(x_i)$ is the pixel color of $x_i$ as projected onto the source image, and $m(x_i)$ is a binary function that returns 1 when $x_i$ lies within the mask and 0 otherwise. After the colors are initialized, the following energy terms can be minimized:

$$\min C(x) = C_1(x) + C_2(x)$$

where, $$C_1(x) = \|C(x_j) - C(x_i)\|^2$$

$$C_2(x) = \Sigma_i^n \|C(x_i) - P(x_i)\|^2 \text{ if } m(x_i) > 0$$

The extrapolated colors of each visible region can be used to fill-in the corresponding non-visible region (2240).

Figure 26:
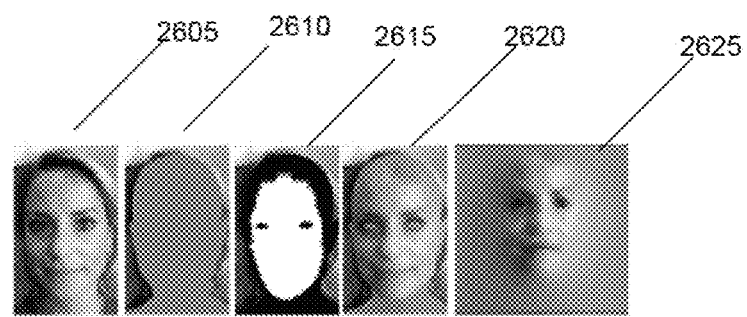
FIG. 26 conceptually illustrates the generation of a visibility mask during a hole filling process in accordance with an embodiment of the invention.

Images showing the generation of the visibility mask in accordance with an embodiment of the invention are shown in FIG. 26. In FIG. 26, image 2605 shows the original source image, the computed 3D geometry is shown in image 2610, the generated visibility mask is shown in image 2615, the colors extrapolated from the visible regions are shown in image 2620, and the final texture flattened in the texture domain is shown in image 2625. In the above extrapolation process, the colors are only computed at the vertices and the extrapolation of the colors causes smoothing of the resulting texture and removal of high frequency details from the original image.

Figure 27:
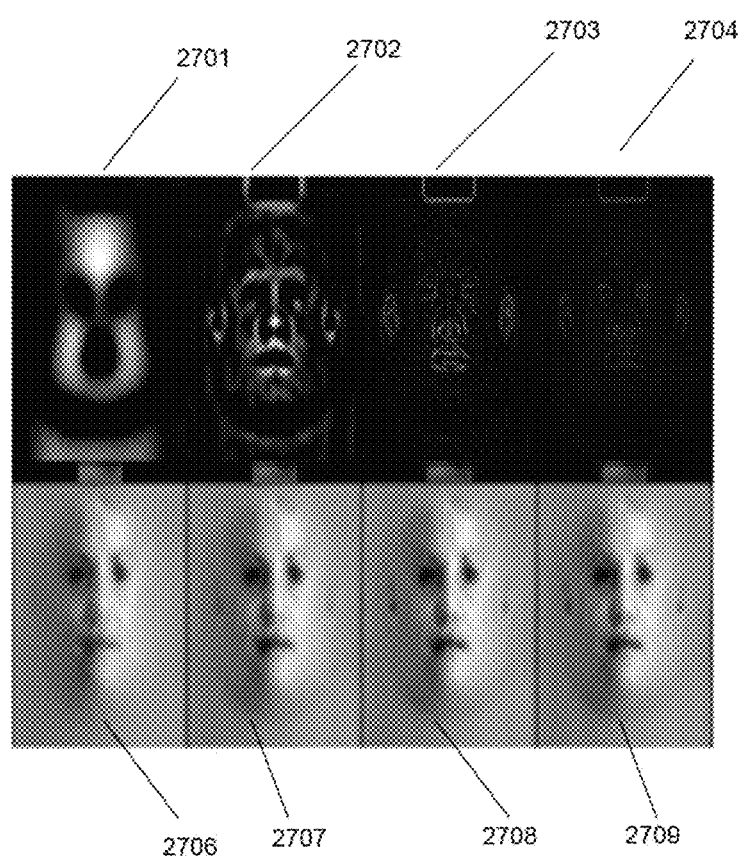
FIG. 27 conceptually illustrates levels of a Laplacian pyramid and resulting textures of a facial image derived from each level during a hole filling process in accordance with an embodiment of the invention.
Figure 28:
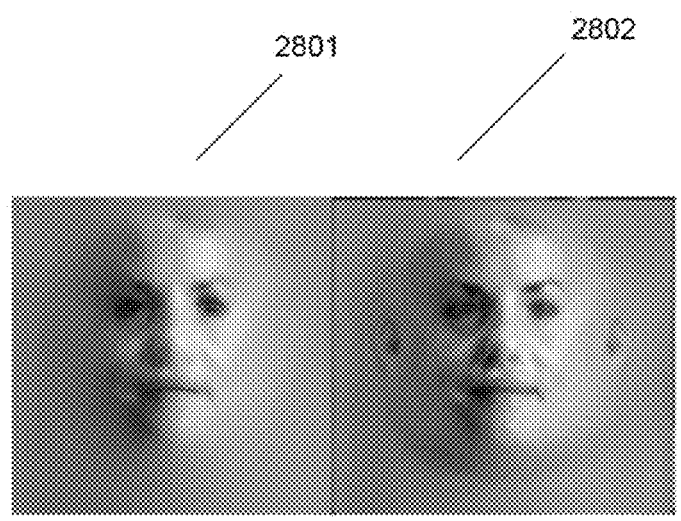
FIG. 28 conceptually illustrates addition of texture during a hole filling process in accordance with an embodiment of the invention.

To correct the smoothing and loss of high frequency details, processes in accordance with some embodiments of the invention may use a Laplacian pyramid to add high frequency details back into the original image (2245). Each level of the Laplacian pyramid computes a different frequency from a given input image. To fill empty regions of the face (regions where $m(x)=0$ in the visibility mask), processes in accordance with many embodiments of the invention create a Laplacian pyramid from a template texture. The template texture is chosen in accordance with several embodiments from a library based on ethnicity and gender classification of the input image. In accordance with a number of embodiments where the texture resolution is 1024×1024, 10 levels of a Laplacian pyramid are used and the lowest 4 levels of the pyramid are ignored because these lowest 4 levels correspond to low frequency details that are not used in the process. Each level of the pyramid can be added into the texture image to add high frequency details to the final textured image. The facial texture of the visible regions in the image (regions where $m(x)=1$ in the visibility mask) can also be added to the texture image. Images of the levels of a Laplacian pyramid and the resulting textures from each level in accordance with an embodiment of the invention are shown in FIG. 27. In FIG. 27, varying levels of the Laplacian pyramid are shown in in images 2701-2704 and the resulting textures from each level of the pyramid are shown in images 2706-2709. The resulting images of the added texture in accordance with an embodiment of the invention are shown in FIG. 28. In FIG. 28, an image 2801 shows the result of adding the texture from the Laplacian pyramids to generate a texture image and an image 2802 shows the result of adding to the visible regions from the visibility to generate the final texture image.

Figure 29:
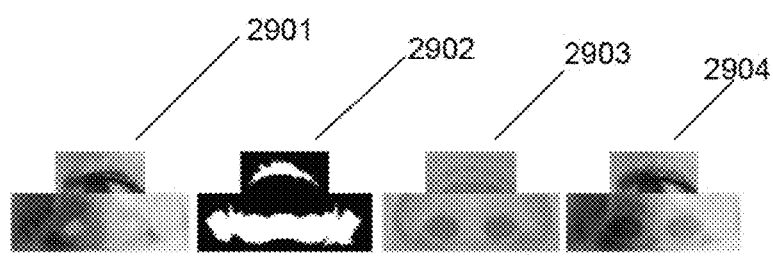
FIG. 29 conceptually illustrates steps of a hole filling process in accordance with an embodiment of the invention.

The above process can be useful for filling in regions or large areas of an image. However, the above process is often not useful for filling holes in smaller regions of the image. Thus, processes in accordance with some embodiments of the invention of fill smaller holes relying on Poisson image editing. Poisson image editing involves determining: a set of image gradients where color values are to be filled; and a set of boundary conditions. In order to fill the regions, the following image term can be minimized:

$$\min(f)^r \ _\Omega |\Delta f - v|^2 \text{ with } f|\delta\Omega = I.$$

by solving the Poisson equation with Dirichlet boundary conditions:

$$\Delta f = div\, v \text{ with } f|\delta\Omega = I$$

where $v$ is a guidance vector field, I, corresponds to the color values being solved and I is the boundary conditions. In accordance with some embodiments, $v$ is computed as the S, $\Delta f$, the gradient of a source template image in the region being filled. The source template may be chosen from a library based on a determined ethnicity and/or gender of the face in the image. As u is the gradient of an image, div $v$ simply becomes S, $\Delta f$, the Laplacian of S in the region being filled and the Dirichelet boundary conditions are the boundary pixels of the region being filled that can be determined from the original image and/or the visibility mask. Images showing the steps of a hole filling process in accordance with an embodiment of the invention are shown in FIG. 29. In FIG. 29, images 2901 show a portion of a source image, images 2902 show a portion of the image mask that needs filling, image 2903 shows the template image, and image 2904 shows the filled-in image.

Although various processes for filling holes in images of faces are discussed above with reference to FIG. 22, other hole filling processes that add, omit, and/or combine steps may be performed in accordance with other embodiments of the invention depending on the exact requirements of the system.

Facial Landmark Identification

Figure 30:
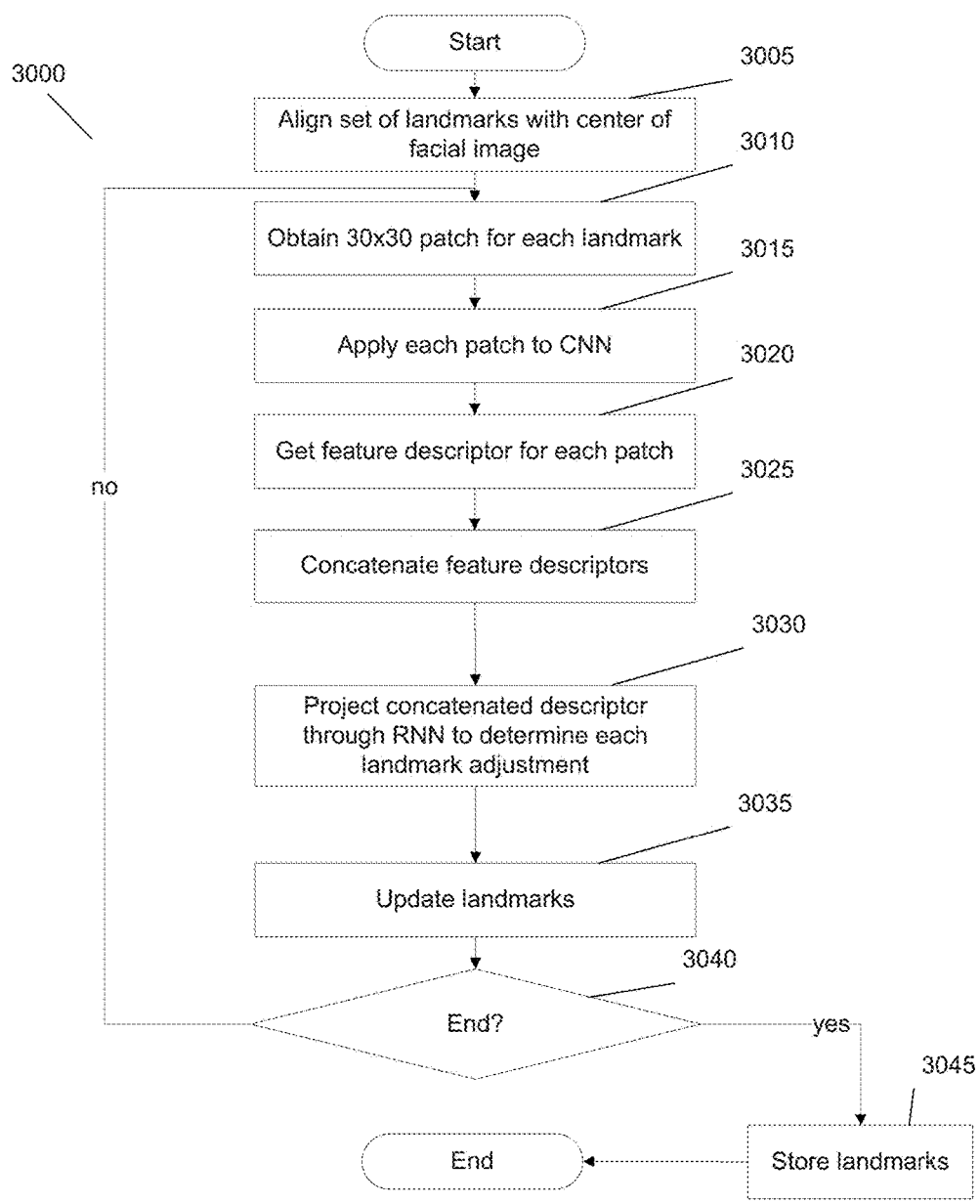
FIG. 30 illustrates a flow diagram of a process for landmark identification in accordance with an embodiment of the invention.

The identification of certain features or landmarks of a face can be useful in a variety of applications including (but not limited to) face detection, face recognition, and computer animation. In many embodiments, the identification of landmarks may aid in animation and/or modification of a face in a 3D model. In accordance with some embodiments of an invention, a Mnemonic Descent Method (MDM) is used for facial landmark tracking. The goal of tracking the facial landmarks is to predict a set of points on an image of a face that locate salient features (such as eyes, lip corners, jawline, etc.). The MDM performed in accordance with many embodiments of the invention predicts facial landmarks by jointly training a convolutional neural network (CNN) and a recurrent neural network (RNN) to refine an initial set of landmarks on the image until the landmarks are in the correct positions on the face of the subject. A process for performing MDM in accordance with an embodiment of the invention is shown in FIG. 30. In FIG. 30, the process 3000 starts with an initial reference set of 68 landmarks, $x_0$, aligned to the center of the subject's face (3005). The process 3000 (e.g. a 30×30 patch) iteratively repeats the following process. A patch of pixels around each landmark is obtained (3010.) Each obtained patch is applied to a CNN (3015) to get a feature descriptor of length N for each patch (3020). The descriptors can be concatenated together to get a descriptor encapsulating all of the patches (3025). The concatenated descriptor can be projected by an RNN to determine the amount each landmark should be adjusted, $\Delta x_i$ (3030). In accordance with some of these embodiments, the RNN includes a hidden state that begins as a zero vector that is updated at each step and passed to the next step. The landmark positions can be updated for the next step with $x_i+1=x_i+\Delta x_i$ (3035). The process determines whether the determined positions of the landmarks are satisfactory. In accordance with some embodiments, this may be determined by passing through the iterative process a predetermined number of times. However, other thresholds may be used to make this determination. If the landmarks are satisfactory, the landmarks are stored in memory (3045) for future use. Otherwise, the iterative process is repeated.

Figure 31:
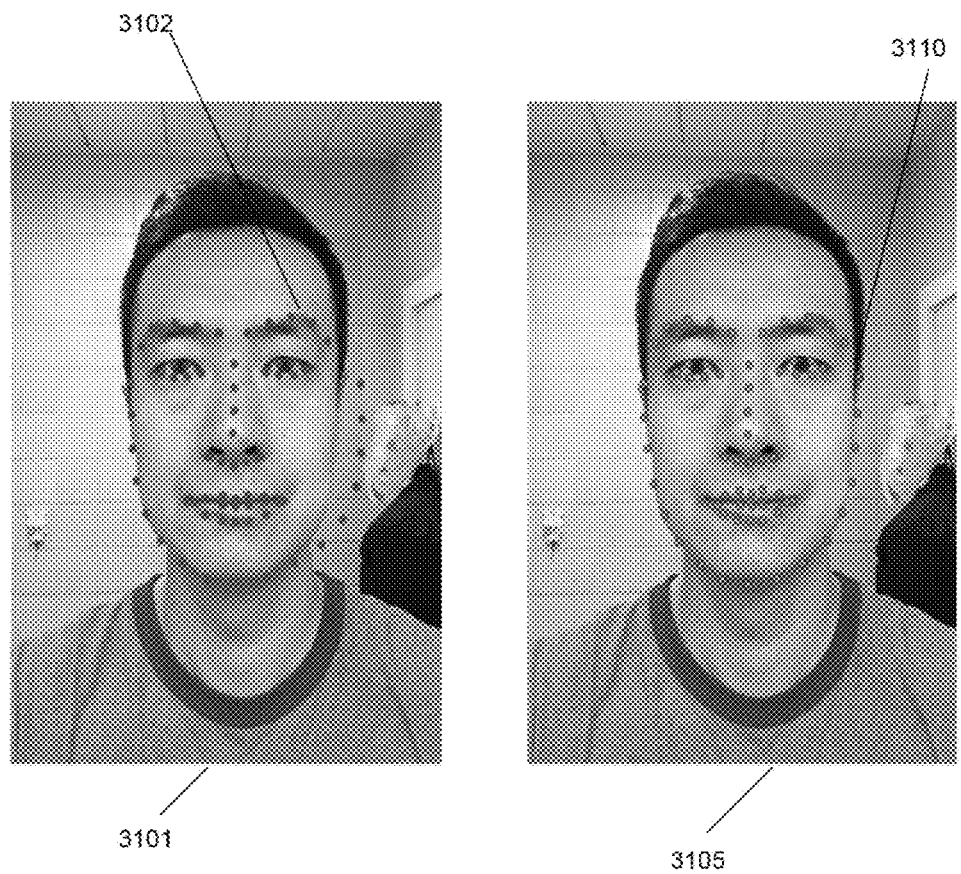
FIGS. 31-35 show comparisons of landmarks determined by a landmark identification process in accordance with an embodiment of the invention and another landmark identification process.
Figure 32:
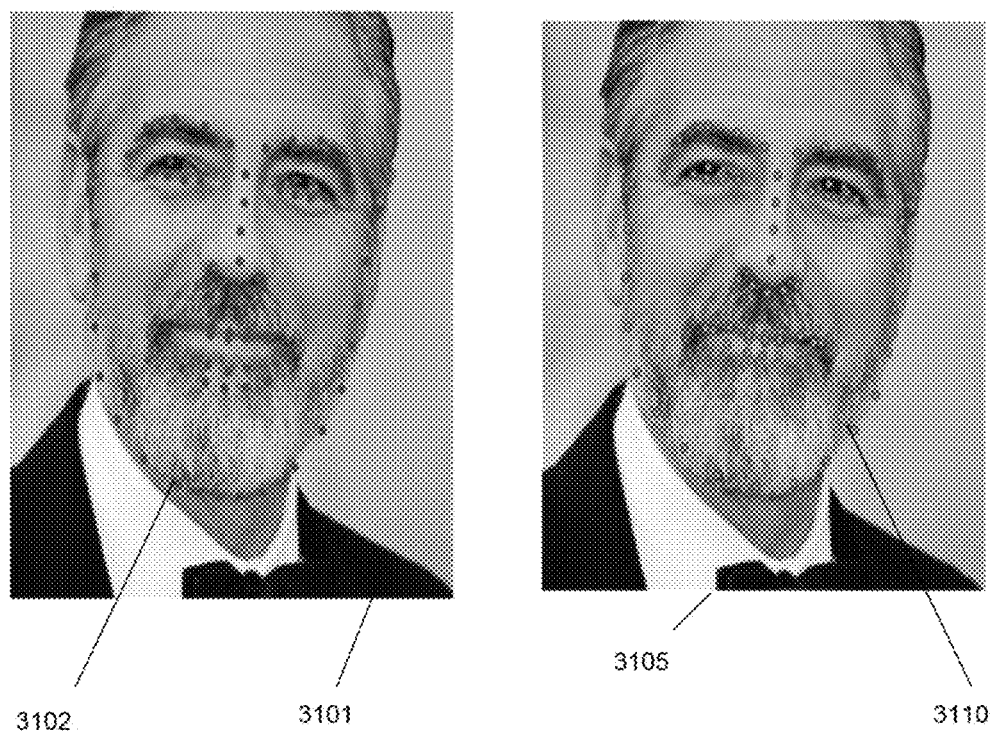
Figure 33:
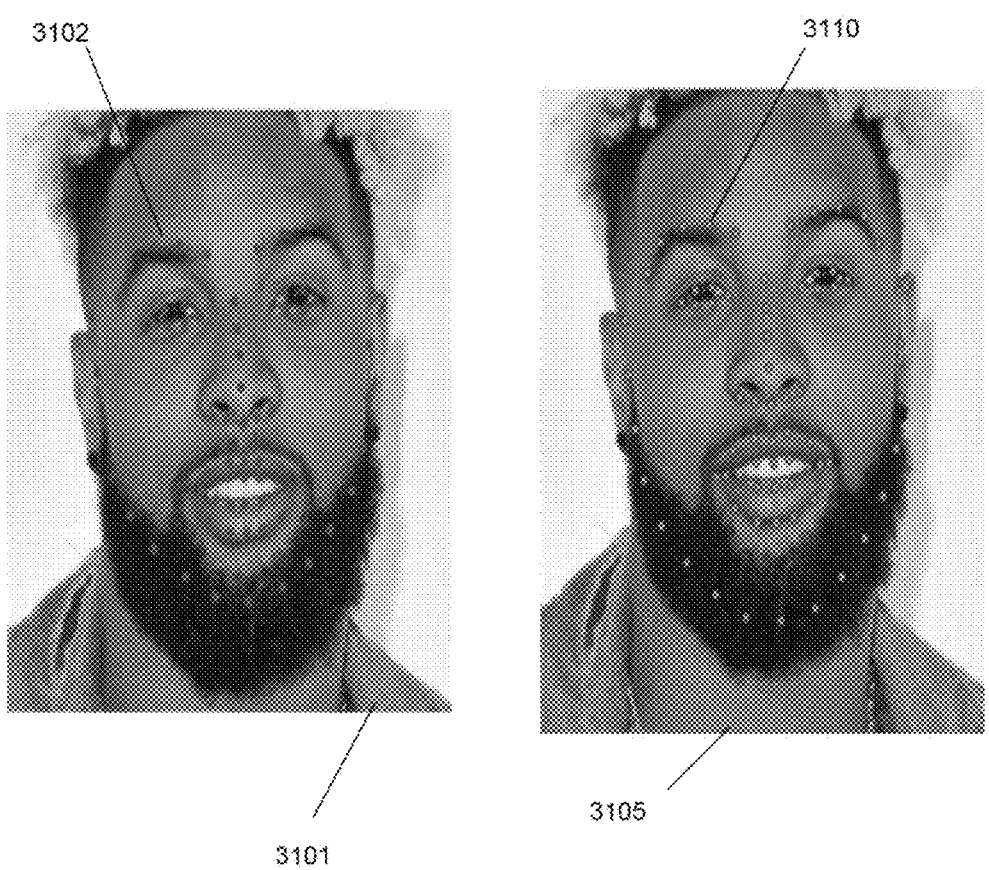
Figure 34:
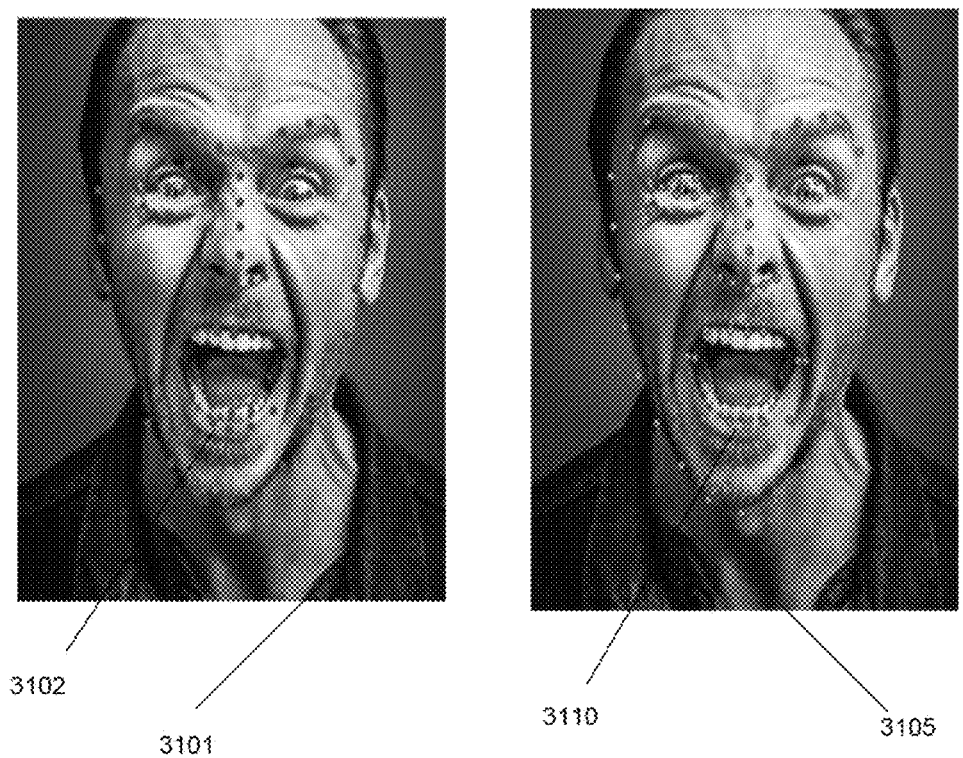
Figure 35:
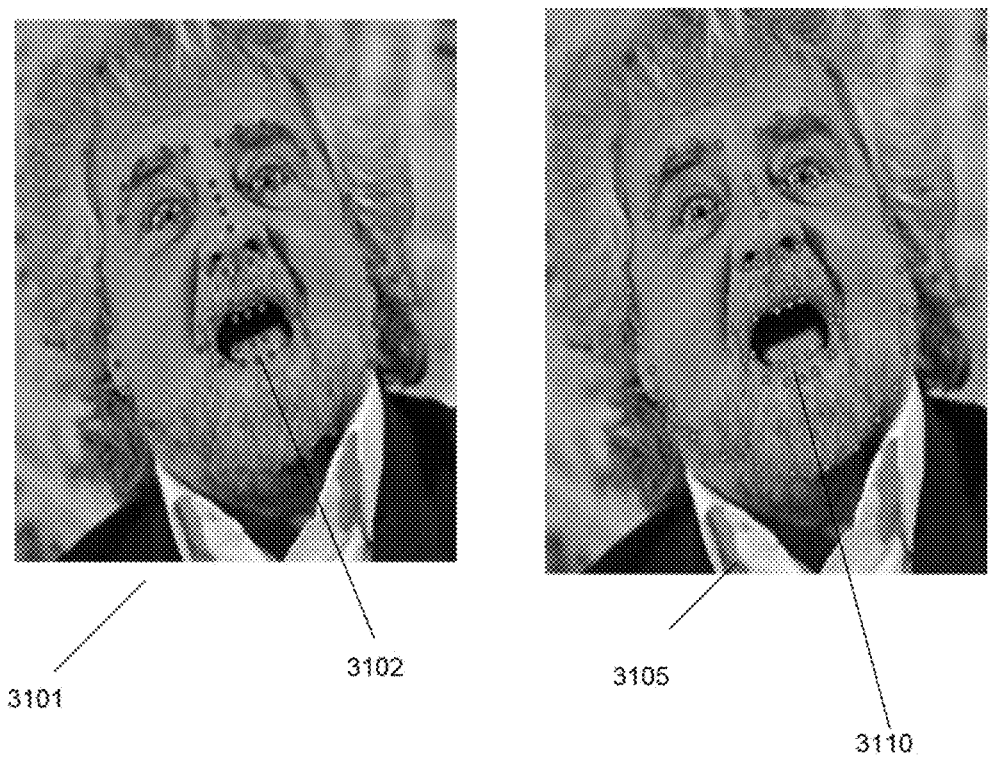

By training a CNN and a RNN to minimize the error between the predicted landmarks and the ground truth landmarks in a dataset, a MDM process in accordance with some embodiments of the invention is able to learn the best way to refine the landmarks for a given image and is more robust to head pose and image content than other landmark identification methods. Example of some comparisons of the landmarks determined by a MDM in accordance with an embodiment of this invention and the landmarks determined by a conventional landmark identification process are shown in FIGS. 31-35 and illustrate the improved performance of the MDM in accordance with an embodiment of the invention. In FIGS. 31-35, the images 3101 show the facial landmarks 3102 identified by a conventional landmark identification process and the images 3505 show the landmarks 3110 identified by a MDM in accordance with an embodiment of the invention. In FIG. 31, the landmarks 3102 in the image 3101 do not properly align with one side of the face while the landmarks 3110 in the image 3105 align with the side of the face. In FIG. 32, the landmarks 3102 in the image 3101 do not properly align with the mouth and instead are aligned with a portion of the beard while the landmarks 3110 in the image 3105 align with the mouth. In FIG. 33, the landmarks 3102 in the image 3101 do not properly align with the jawline of the face and instead align with the beard while the landmarks 3110 in the image 3105 align with jawline in the beard. In FIG. 34, the landmarks 3102 in the image 3101 do not properly align with the mouth and instead align with the teeth while the landmarks 3110 in the image 3105 align with the lips of the mouth. In FIG. 35, the landmarks 3102 in the image 3101 do not properly align with the mouth and instead aligning with the tongue inside the mouth while the landmarks 3110 in the image 3105 align with properly with the lips of the mouth.

MDM processes in accordance with some embodiments of the invention involve the use of an RNN that uses dense matrix multiplication to project image patch features and a CNN that produces a large feature vector for each patch. As a result, the size of the model can explode to over 80,000,000 parameters. This can limit the applications of MDM, since the model size is 309 MB when saved to memory and a large computational load is needed to make a prediction.

Figure 36:
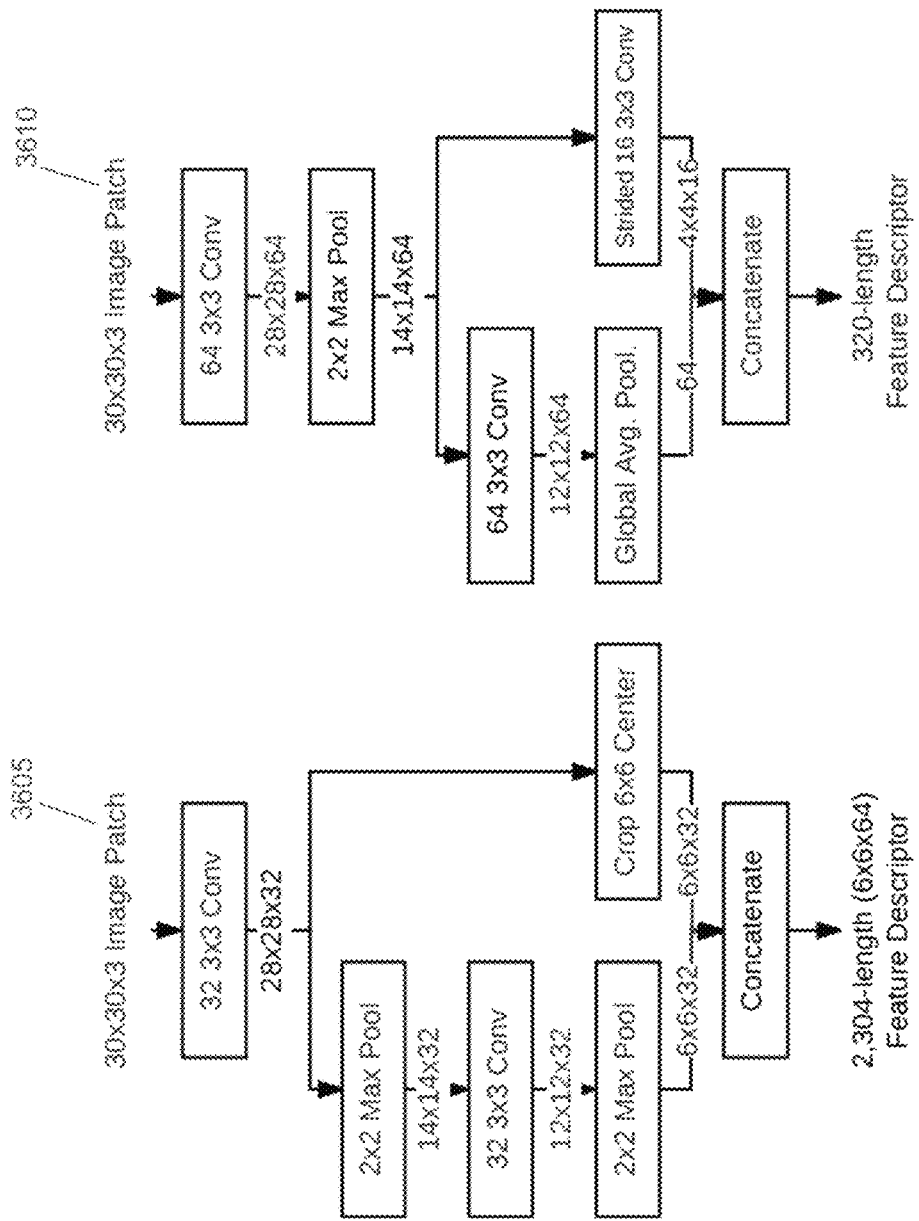
FIG. 36 illustrates an architecture of a conventional MDM compared to an architecture of a MDM in accordance with an embodiment of the invention.

To make the MDM process more lightweight, an MDM process in accordance with many embodiments of the invention may modify the architecture of the CNN to reduce the size of the feature descriptor for each patch by several magnitudes. A CNN architecture 3605 of an MDM process that does not use feature compression compared to a CNN architecture 3610 of a MDM that does use feature compression in accordance with an embodiment of the invention is shown in FIG. 36. In architecture 3610, a global average pooling is used after the final convolution layer in the CNN to obtain a fixed output size that is invariant to the size of the input patch. The fixed output size causes each feature map in the CNN kernels to correspond with a global latent feature in the image patch (as opposed to a latent feature that is dependent upon spatial location).

The global average pooling discards spatial information in the image. As such, MDM processes that utilize feature compression are able to determine the general head pose in the image but often fail to obtain the exact locations of each landmark in the image. To account of the loss of spatial information, an additional convolution layer can be added that does not get pooled, has fewer feature maps, and/or has a large stride to generate additional feature vector that is relatively small but retains spatial information give the CNN more guidance in moving each landmark. In accordance with some embodiments, these optimizations can reduce the size of the MDM network from 309 MB to 30-45 MB and/or reduce the runtime from 232 ms to 169-176 ms while maintaining a similar performance as the base model.

Although various MDM processes are discussed above with reference to FIG. 30, other landmark identification processes may be performed in accordance with certain embodiments of the invention depending on the exact requirements of the system.

Iris Geometry Determination

In accordance with some embodiments, a process may determine a geometry of the iris in one or both eyes. A process for determining iris geometry in accordance with some embodiments of the invention may segment out the visible eye in the image by fitting curves to each of the upper and lower eyelids in the image. The pixels are quantized/classified by colors. In accordance with a number of embodiments, a K-means classifier may be used to separate pixels showing the sclera/hilite, sclera/iris, iris, and pupil. Spatial clustering may be used to select pixels from these boundary colored pixels that are grouped into likely iris edge zones of the visible eye in the image. The iris center and radius are determined by fitting circles to selected iris boundaries on one and/or both eyes visible in the image. If both eyes are used, a constraint that the iris must be similarly sized may be used.

Although embodiments of iris determination processes are described above, other iris geometry determination processes may be performed in accordance with certain embodiments of the invention depending on the exact requirements of the system.

Iris Color Estimation

An estimation of the iris color in accordance with some embodiments may be useful because eyes in images are often varying shades of brown even if the color is perceived as blue, so simple color matching may not provide an accurate color of the iris. To estimate the color of an iris in an eye visible in the image, a process in accordance with many embodiments can use segmented iris and/or sclera to predict whether an iris color is pigment based (brown) or structural reflective. To do so, processes in accordance with several embodiments use hue histograms (12 bins is preferable but not required); sclera/iris contrast and lightness; and ethnicity cues as features for a classifier that predicts the perceived color of a visible eye given segmented pixels. In accordance with a number of these embodiments, a random forest classifier is used.

Although embodiments of iris color estimation processes are described above, other iris color estimation processes may be performed in accordance with certain embodiments of the invention depending on the exact requirements of the system.

Generating a Customized Rig for a Custom Static 3D Model

Figure 5A:
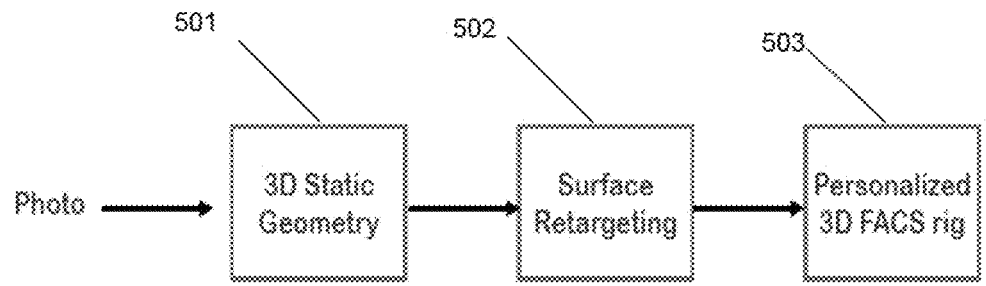
FIG. 5A is a conceptual diagram of a processing pipeline for generating a rig for a static 3D model of a head generated from a captured image of the head in accordance with an embodiment of the invention.
Figure 5B:
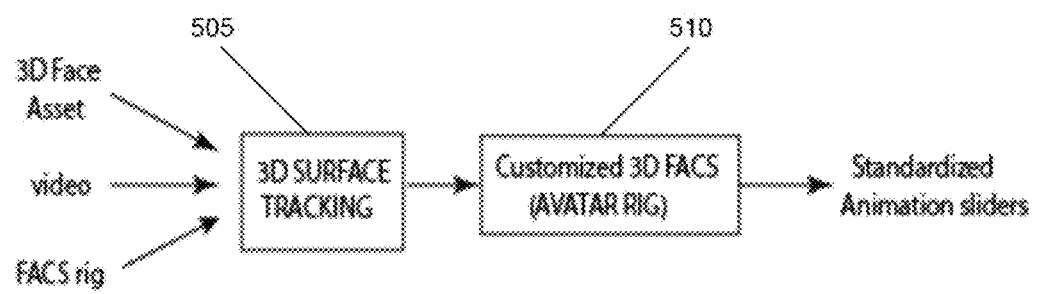
FIG. 5B is a conceptual diagram of a processing pipeline for generating a customized rig for a static 3D model of a head generated from a captured image of the head in accordance with another embodiment of the invention.

To animate a customized static 3D model, a rigging process can be performed to generate a rig that changes the features of the 3D model. The combination of the customized static 3D model and the rig form an animation-ready 3D model that may be used to generate different poses for animation. Conceptual diagrams of processing pipelines for generating rigs for customized static 3D models in accordance with two embodiments of the invention are shown in FIGS. 5A and 5B. In the rigging processing pipeline shown in FIG. 5A, an single capture image is used to generate the customized rig for the customized 3D model, In FIG. 5A, the image is used to determine a 3D static geometry 501, and surface retargeting 502 is performed on the static geometry 501 to generate the customized rig 503. In the rigging processing pipeline shown in FIG. 5B, the customized static 3D model, video of the face moving, and a generic FACS rig are used by a 3D surface tracking process 505 that determines the movements of shapes in the 3D model based upon surface tracking in received video content. A rigging process 510 sets the rig to the customized static 3D model based on the tracked motion of the shapes. The result and/or animation-ready 3D model incorporating a rig that may be manipulated with standardized animation sliders and/or parameters.

Figure 6:
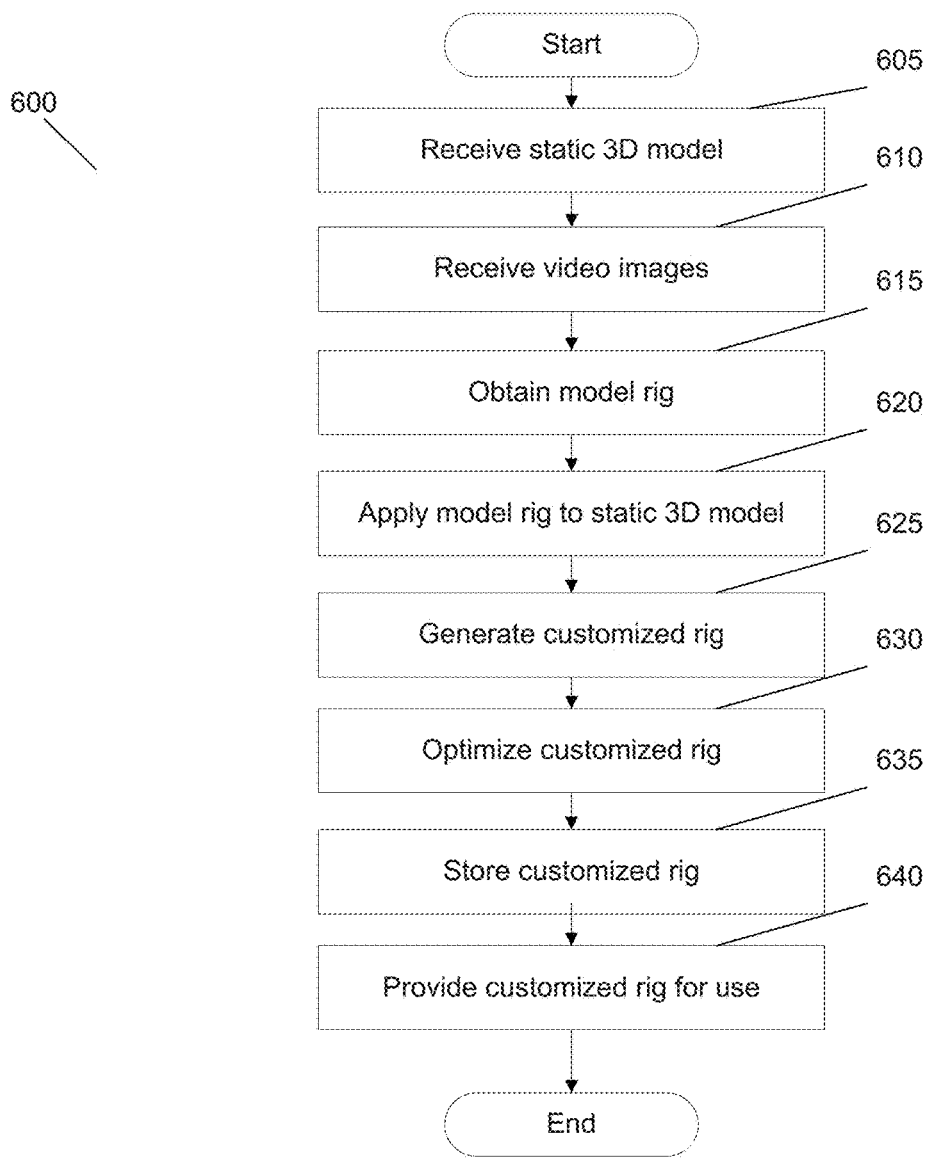
FIG. 6 illustrates a flow diagram of a process performed by one or more devices to generate a rig for a static 3D model of a head generated from a captured image of the head in accordance with an embodiment of the invention.

A flow diagram of a rigging process for generating a rig for a customized static 3D model of a head in accordance with an embodiment of the invention is shown in FIG. 6. In process 600, a customized static 3D model of a head (605) and video images of a source face (610) are received. In accordance with some embodiments, the source video has several facial gestures that allow a large variety of facial movements to be detected. In accordance with some of these embodiments, the video images are taken of the face performing pre-defined, scripted movements that highlight different facial movements. Model rig is obtained (615). In accordance with some embodiments, a previously generated model rig can be read from a memory accessible by the system performing the process. In accordance with many embodiments, the rig is a set of standard FACS blend shapes.

The rig model is applied to the customized static 3D model (620). The rig can be customized to the model using the video of the performance (625). In accordance with some embodiments, the rig model is initially fitted to the shapes of the static 3D model. The blend shapes are customized to best fit the facial motions of the face by tracking a 3D surface to the face in the received video images and re-computing the blend shapes to best fit the tracked 3D surface in the video images.

In accordance with some embodiments, the 3D surface is tracked by solving the optimizing equation shown below for each frame or image in the video images:

$$\underset{\overline{\alpha}, \overline{\omega}, v}{\arg\min} \|E_{data} + \beta_{shape} \times E_{reg}^{shape} + \beta_{tex} \times E_{reg}^{texture}\|_2^2$$

except that the shape is defined by a FACS blend shape basis, $B^{FACS}$, instead of the general blend shape basis used to generate the customized static 3D model as shown in the following equation:

$$S(\overline{\alpha}, \overline{v}) = B^{FACS}(\overline{\alpha}_{blend}) \times C(\overline{\alpha}_{corr}) \times F(\overline{v})$$

where $B^{FACS}(\overline{\alpha}_{blend})$ is the FACS blend shape basis. Using the above equations, the 3D surface of the face in a sequence of t video images results in a tracked surface, G (t). The final step is to resolve the FACS blend shape basis, $B^{FACS}$ to best fit the tracked surface as expressed in the following equation to optimize the rig (630):

$$\underset{\hat{B}^{FACS}}{\arg\min} \|G(t) \ldots S(\overline{\alpha}, \overline{v}, t)\|_2^2$$

The customized rig can be stored in memory for use in other applications (635) and provided for use by a specific application (640). In accordance with some embodiments, the customized rig is provided by transmitting the customized rig to an application on a user device via a communications network. In many embodiments, the customized rig is provided by passing the customized rig to another application being executed by the system.

Although various processes for generating custom rigs fit to static 3D models of human faces are described with reference to FIG. 6, other processes may be used to automatically rig 3D models of human faces as appropriate to the requirements of a given system in accordance with other embodiments of the invention.

Generating a Mapping of Rig Parameters to Audio Samples

Animation that synchronizes movements of a 3D model of a face to audio data that mimics the face's speech patterns and/or other facial expressions can be achieved using a mappings between audio samples of sounds and images containing facial expressions and sets of rig parameters that form a 3D model of a face into the facial expression for making the sounds and/or captured facial expressions. For purposes of this discussion, a sample of audio is a window or frame of audio content provides audio content for a certain time period of playback. In accordance with a number of embodiment, the amount of playback time per sample of audio content is equal to the framerate of the animation being generated. In accordance with some embodiments, general sets of rig parameters may be determined by using video and/or images captured of a variety of speakers and mapped to various sounds, emotions and/or other stimuli. These general sets of rig parameters may be applied to the rig of any customized 3D generative animation model to allow a newly created 3D model to be immediately animated. However, these general sets of rig parameters may not exactly match the expression of a particular user.

Figure 7:
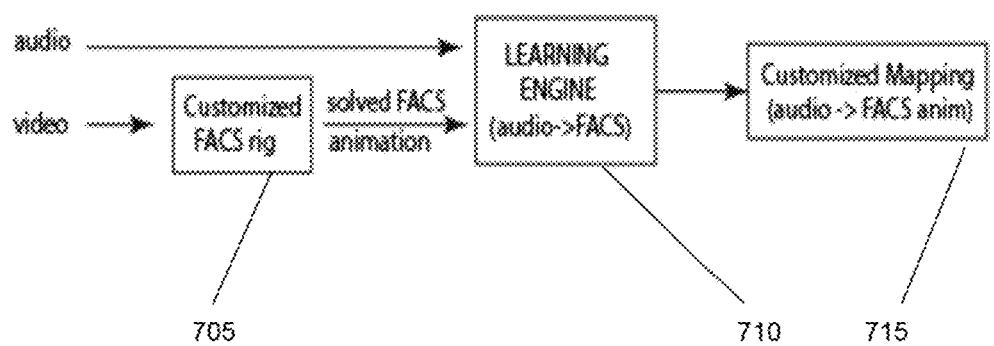
FIG. 7 is a conceptual diagram of a processing pipeline for mapping rig parameters to audio samples in accordance with an embodiment of the invention.

A conceptual diagram of a processing pipeline for generating mappings for sets of rig parameters and particular sounds in accordance with an embodiment of the invention is shown in FIG. 7. The processing pipeline for generating mappings receives video images and synchronized audio data. As discussed above, the video images may be of one or more speakers to generate general sets of rig parameters and/or from a particular user to generate customized sets of rig parameters for a customized 3D model based on the particular user. The video images can be applied to the customized rig 705 to determine a set of rig parameters for each facial expression made in the images. The sets of rig parameters and the audio can be initialized by a learning engine 710 that generates mappings 715 between each set of rig parameters and a sample of set of samples of the input audio.

Figure 8:
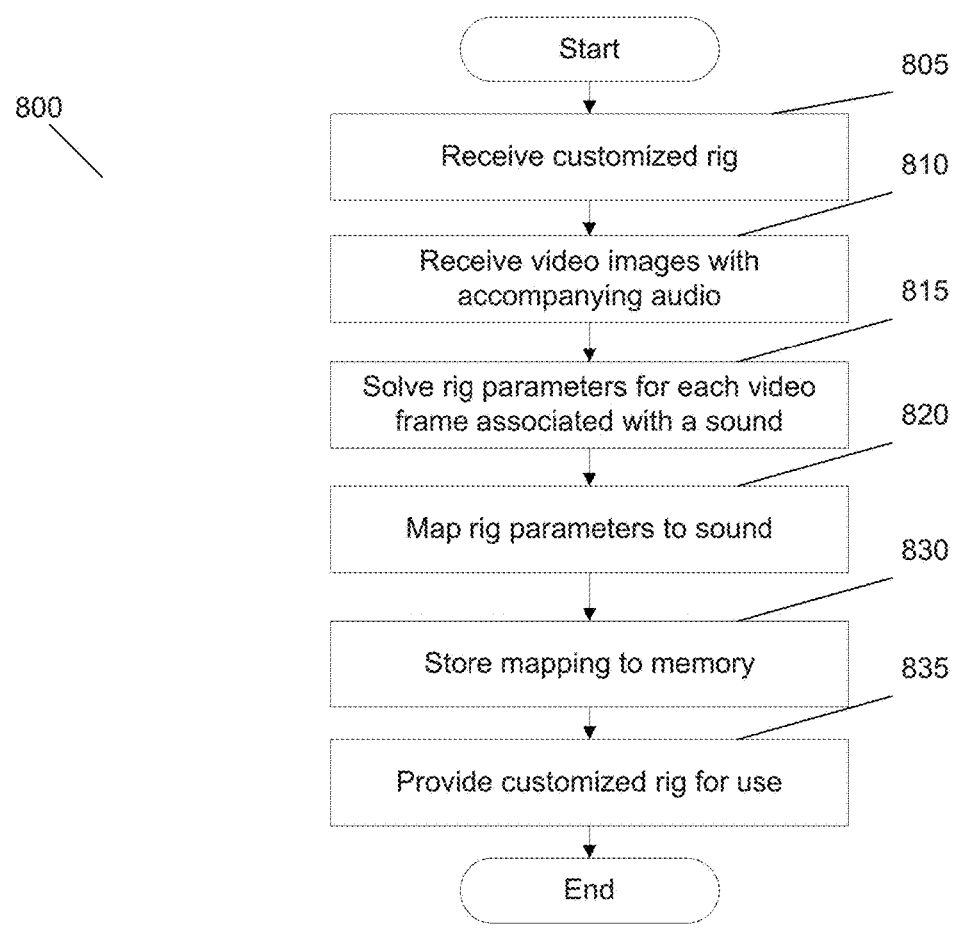
FIG. 8 is a flow diagram of a process for mapping rig parameters to audio samples in accordance with an embodiment of the invention.

A process for training the rig to animate a customized 3D model to generate facial expressions corresponding to generated sounds and show a particular expression as well as mapping the expressions to particular sounds, emotions, and/or other forms of stimulus in accordance with an embodiment of the invention is shown in FIG. 8. Process 800 receives the customized rig (805) for a customized 3D model such as a model generated using 2D captured images of a face using a process similar to any of the processes described herein. A training set of video images along with accompanying audio data is received (810). In accordance with some embodiments, the video images are of a human the face performing a pre-determined script or line of dialog that shows the facial expressions made for a number of predetermined sounds made while speaking or communicating in another manner. In accordance with many embodiments, the audio content received with the video images is synchronized to the video content for use in mapping expressions to sounds.

The rig parameters for the rig are determined for each sound (815). In accordance with some embodiments, the rig parameters, $(\overline{\alpha}, \overline{v})$, are solved to match every image or frame in the video images by a process similar to the process described above with regards to generating the customized rig. In particular, a 3D surface is tracked by solving the optimizing equation shown below for each frame or image in the video images:

$$\underset{\overline{\alpha},\, \overline{\omega},\, v}{\arg\min} \, \|E_{data} + \beta_{shape} \times E_{reg}^{shape} + \beta_{tex} \times E_{reg}^{texture}\|_2^2$$

Using the shape is defined by FACS blend shape basis, $B^{FACS}$ as shown in the following equation:

$$S(\overline{\alpha}, \overline{v}) = B^{FACS}(\overline{\alpha}_{blend}) \times C(\overline{\alpha}_{corr}) \times F(\overline{v})$$

where $B^{FACS}(\overline{\alpha}_{blend})$ is the FACS blend shape basis for the customized 3D generative animation model. Using the above equations, the 3D surface of the face in the t video images in a tracked surface G (t) are used to determine a set of rig parameters for an expression for making a particular sound. In accordance with some embodiments, the tracking may be based on identified features within the surface. In accordance with many embodiments, the tracking may be performed on a per pixel basis.

In accordance with some embodiments, the rig parameters are nonlinearly related to a rigged models shape changes. The relationship is nonlinear because nonlinear corrective shapes account for interactions between blend shapes. As such, some groups of rig parameters are mutually exclusive in order to provide plausible animation of the model. Thus, processes for determining the rig parameters in accordance with some embodiments are nonlinear guided optimizations of the parameters. In accordance with many embodiments, the determining of the rig parameters may be performed in stages over different subsets of rig parameters where each subset explains a different fraction of variation in the image. The stages in accordance with several embodiments may include, but are not limited to a rigid solve stage, a mouth solve stage, and a upper face solve stage. The rigid solve stage may determine rig parameters explaining motion of non-deforming head features as a rigid motion of the head and may be used to stabilize the geometry for other stages. The mouth solve stage may determine rig parameters for the jaw opening to match a chin position and for mouth shape networks including, but not limited to, moving of mouth corners inward and/or outwards, and rolling of the lips. In accordance to a few embodiments, complementary or exclusive shape groups may be coupled using optimizer constraints. The upper face solve stage determines the rig parameters for facial features independently of the mouth shape networks. Example of facial features that may have movement determined in the upper face solve stage include, but are not limited to, eyes, eyebrows, and nostrils.

The received audio can be divided into samples of particular sounds and each set of rig parameters for an expression is mapped to a particular sample or sound (820). In accordance with some embodiments, a machine learning system is used to generate mappings. In accordance with many of these embodiments, a supervised learning algorithm is used to compute mappings between each set of rig parameters and a particular sound or sample.

The mappings between the sets of rig parameters and sounds or samples can be stored in a table or some other data structure in memory for later use (830) and/or the mappings can be provided to another application or device for use (835). In accordance with some of these embodiments, the mappings are provided to an application on a user device via a communications network.

Although various processes for generating a between sets of rig parameters for expression of a face and sounds or samples of audio data are described above with reference to FIG. 8, other processes appropriate to the requirements of a given application may be used in accordance with other embodiments of the invention.

Providing Animation from an Input Audio

Figure 9:
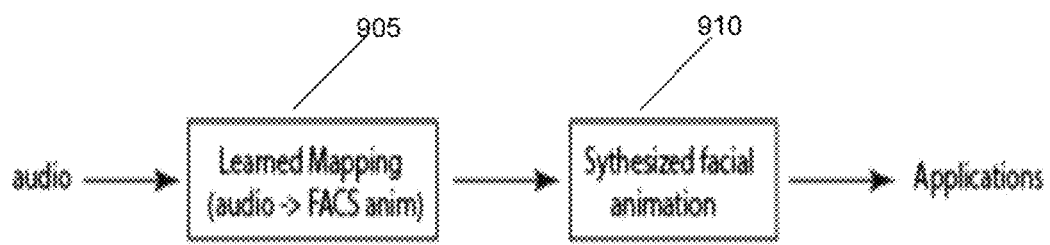
FIG. 9 is a conceptual diagram of processing pipeline for animating a 3D model of a head using the mapping of rig parameters to audio samples in accordance with an embodiment of the invention.

Mappings of the set of rig parameters for the customized rig to sounds or samples of audio content may be used to generate an animation of the head based upon received audio content. The animation preferably resembles the speech patterns of the user from which the head is modelled. A processing pipeline for generating animation of a 3D model from input audio in accordance with an embodiment is shown in FIG. 9. The audio animation pipeline receives audio content. In accordance with some embodiments, the audio content is recorded audio data. In accordance with some other embodiments, the audio content may be text that is to be converted to an audio rendition. The audio content can be applied to a mapping process 905 that uses the mappings between sets of rig parameters for the rig of the 3D model and sounds or audio samples to generate a synthetic facial animation 910. The synthetic facial animation can be represented as one or more playlists of sets of parameters that are synchronized to sounds and/or samples of the input audio content. In accordance with some other embodiments, the animation of the 3D model can be represented using a variety of techniques including, but not limited to, a sequence of motion variable as appropriate to the requirements of the invention.

Figure 37:
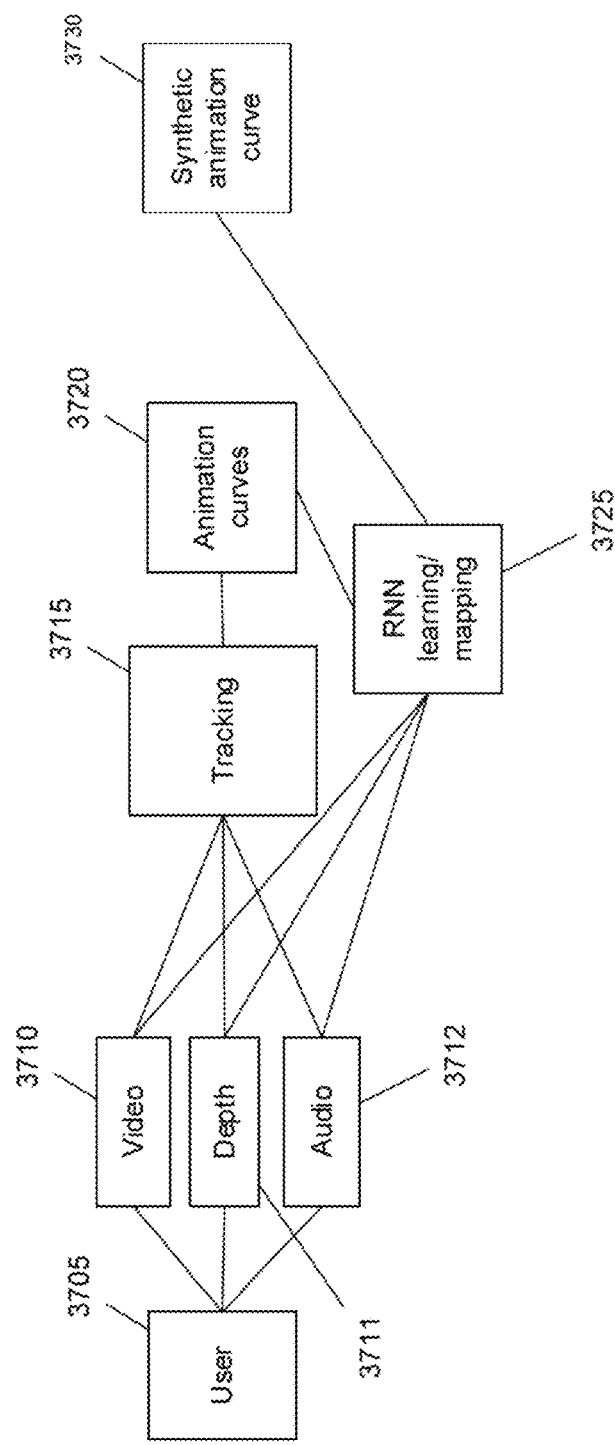
FIG. 37 illustrates a processing pipeline for using a temporal model to map sets of rig parameters to input audio and/or video in accordance with an embodiment of the invention.
Figure 39:
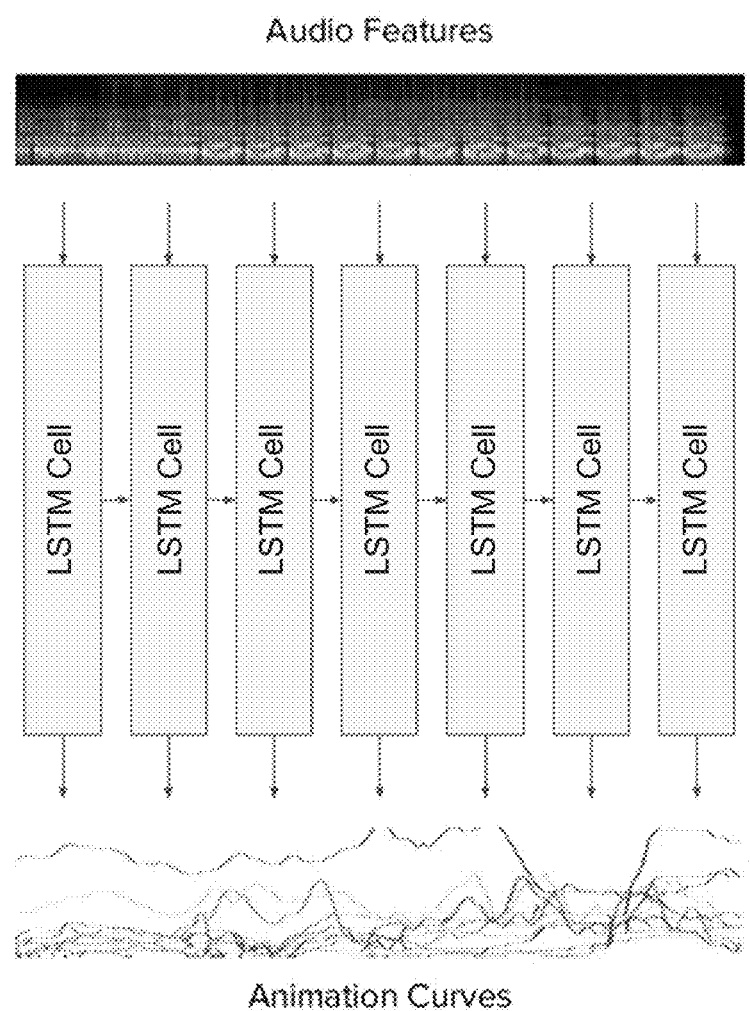
FIG. 39 conceptually illustrates a RNN providing a temporal model in accordance with an embodiment of the invention.
Figure 40:
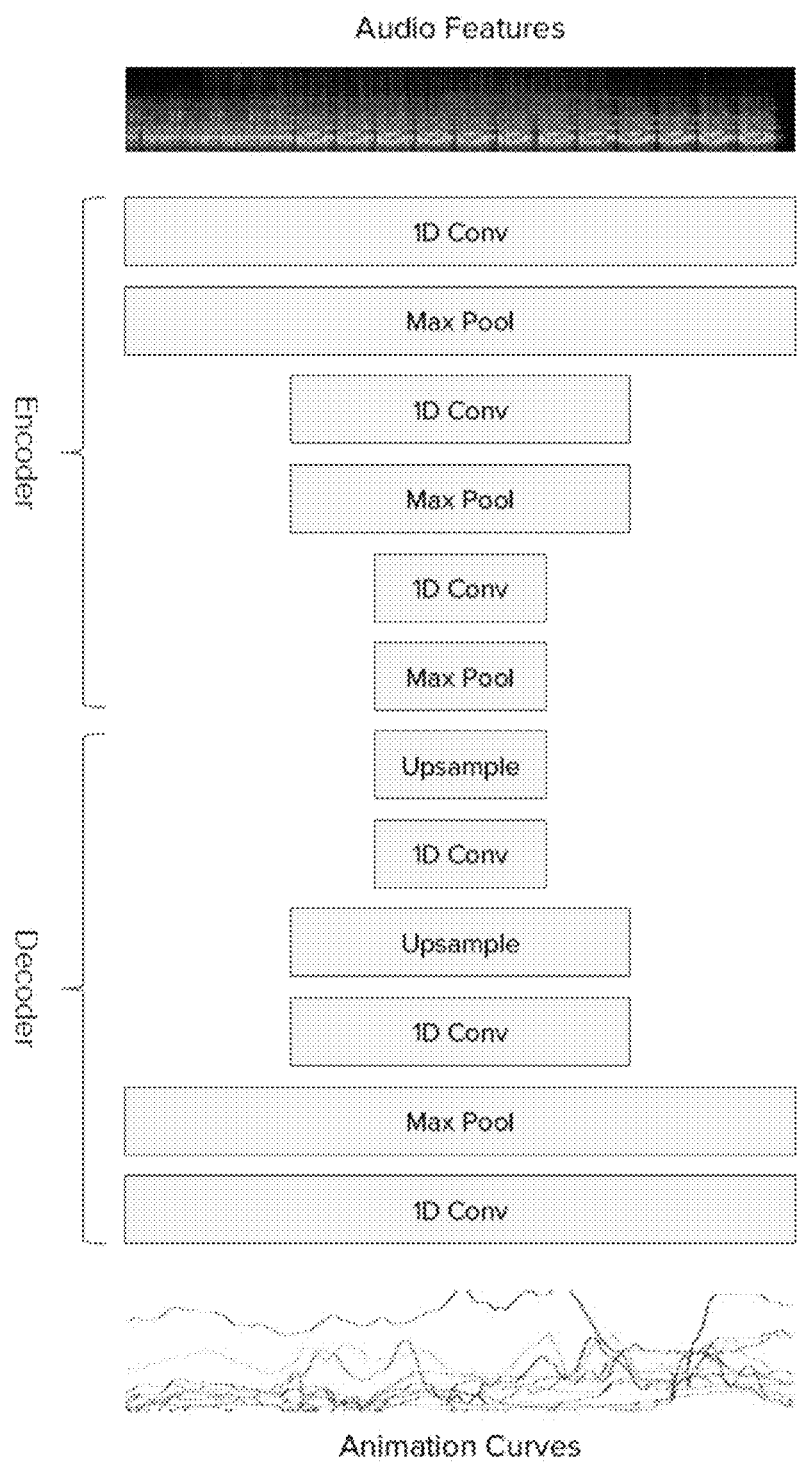
FIG. 40 conceptually illustrates a CNN providing a time series model in accordance with an embodiment of the invention.

In accordance with some embodiments, processing pipelines for generating and mapping the set of rig parameters of customized rigs to audio sample and/or other stimulus use a temporal model to learn/map the associations. For purposes of this discussion, a stimulus is any arbitrary signal from which an animation can be derived including, but not limited to, a vide queue, depth information, and facial landmarks. A processing pipeline using an RNN in accordance with an embodiment of the invention is shown in FIG. 37. In this processing pipeline, video images 3710, depth information for the video images 3711, and/or audio data 3712 of user 3705 can be provided to a tracking process 3715. The tracking process 3715 may be a high fidelity process. In accordance with some embodiments, the tracking process 3715 may track features of the face through the video frames of the images. In accordance with many embodiments, the tracking process 3715 may track the face on a per pixel basis across the frames of the video images. The tracking process 3715 can provide sets of rig parameters, also referred to as animation curves 3720. The sets of rig parameters 3720 as well as video images 3710, depth information for the video images 3711, and/or audio data 3172 of user 3705 can be provided to a learning/mapping process 3725. In accordance with several embodiments, the learning/mapping process 3725 utilizes a temporal model in the form of a RNN that maps the sets of rig parameters to particular sounds and/or other stimulus based on the input video images and/or audio data. A conceptual example of learning/mapping process involving a RNN in accordance with an embodiment of the invention is shown in FIG. 39 where the audio data is provided to LSTM cells that map the audio to the tracked movement in the video images and return the sets of rig parameter/animation curves.

Figure 38:
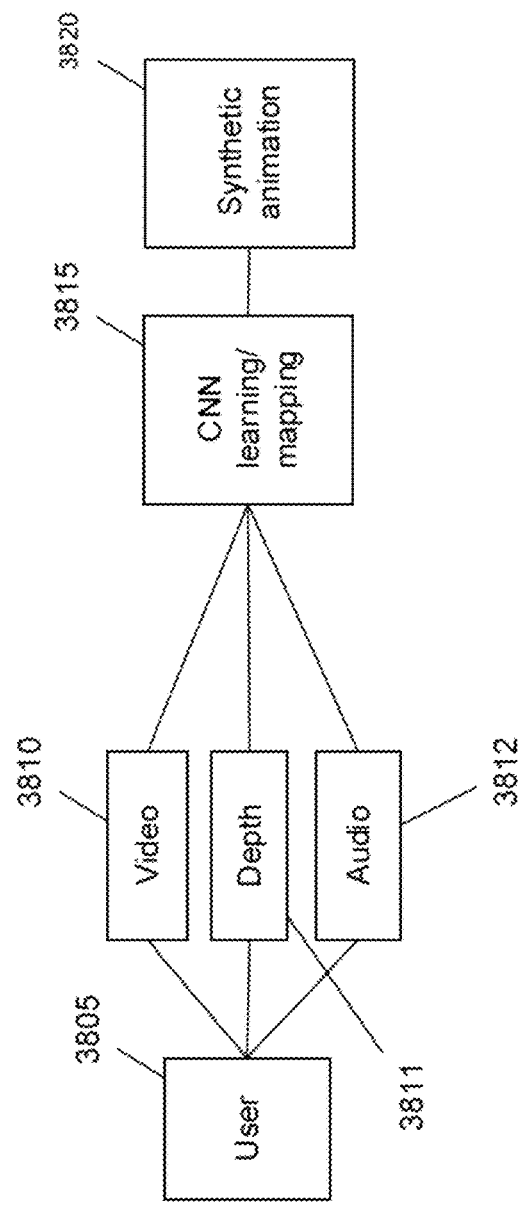
FIG. 38 illustrates processing pipeline for using a time series model to map sets of rig parameters to input audio and/or video in accordance with an embodiment of the invention.

Although various processing pipelines for mapping sets of rig parameters to audio portions and/or other stimulus using temporal models are discussed with reference to FIG. 38, other processing pipelines that provide mapping/learning using temporal models can be utilized based on the requirements of the system in accordance with other embodiments of the invention.

In accordance with many embodiments of the invention, the processing pipeline uses a time series model to determine the sets of rig parameters and mapping of rig parameters to audio data or other stimulus. In the processing pipelines, a trained rig model predicts rig parameters/control curves based on the previously used input data. In accordance with some of these embodiments, the process is performed off-line (some time prior to run-time) and predicts an entire video segment at one time given the entire input stream. In accordance with a number of embodiments, the training occurs on-line (at run time) and only the previous received video and/or audio data is used to determine the set of rig parameters for a current portion of video and/or audio data. A processing pipeline using a time series model involving a CNN in accordance with an embodiment of the invention is shown in FIG. 38. In this processing pipeline, video images 3810, depth information for the video images 3811, and audio data 3812 are provided to a learning/mapping process 3815. In accordance with some embodiments, the learning/mapping process 3815 is provided by a time series model using a CNN. An example of a time series model involving a CNN for a learning/mapping process in accordance with an embodiment of the invention is shown in FIG. 41. Returning to FIG. 39, learning/mapping process 3815 returns the sets of rig parameters/animation curves mapped to particular audio segments and/or other stimulus.

In accordance with some embodiments of the invention, an additional discriminator network may be added to the pipeline to optimize the animation. The discriminator network may be a neural network that compares animation of the training video images to the generated video images to determine whether the generated animation is realistic. To do so, the animation generator in the pipeline may add a noise component to the input audio and generate the sets of rig parameters to generate less realistic animations. The optimization process then becomes a minimum-maximum game where the animation generator tries to fool the discriminator so that the generated animations are indistinguishable from the ground truth animations derived from the training video images. An optimization process in accordance with many embodiments solves ambiguity problems where an input stimulus may have multiple outputs encourages the addition of subtle details that may not be added to the animation in a means-squared error approach.

Although various processing pipelines for mapping sets of rig parameters to audio portions and/or other stimulus using above time series models is discussed above with reference to FIG. 39, other processing pipelines that provide mapping/learning using time series models based on the requirements of the system in accordance with other embodiments of the invention.

Figure 10:
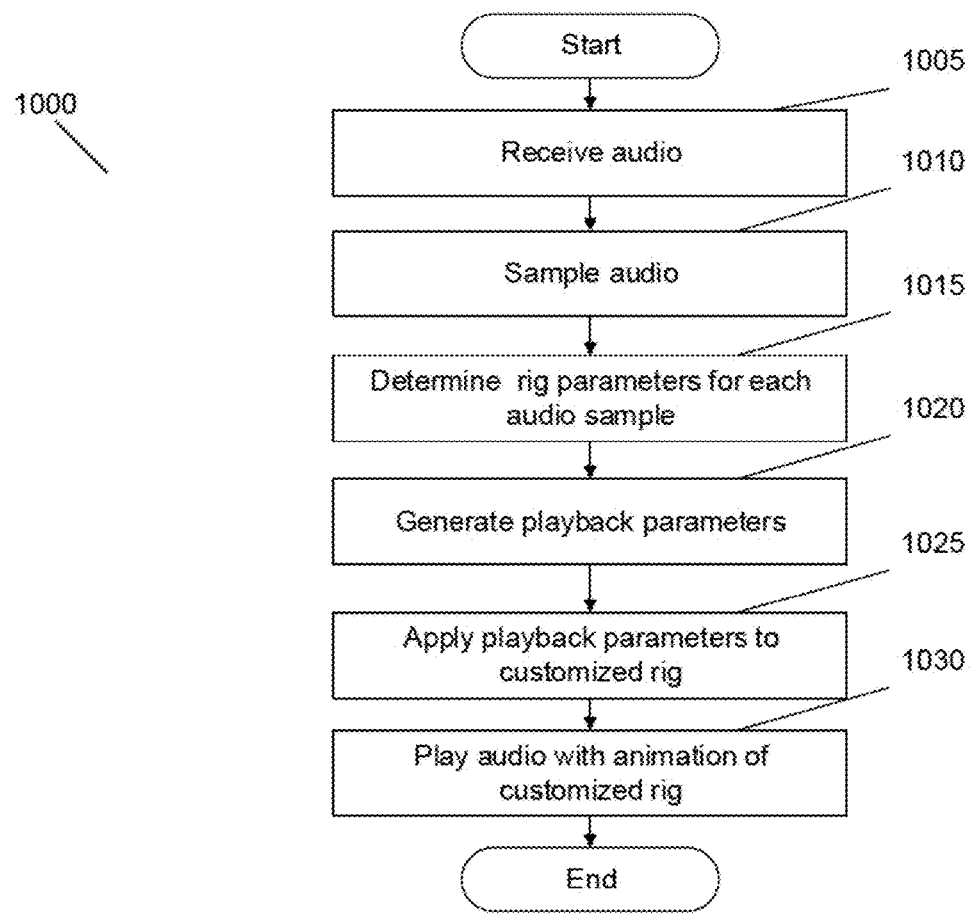
FIG. 10 is a flow diagram of a process for animating a 3D model of a head using a mapping of rig parameters to audio samples in accordance with an embodiment of the invention.

A process for generating animation for a customized 3D generative animation model from input audio content in accordance with an embodiment of the invention is shown in FIG. 10. Process 1000 receives audio content 1005. In accordance with several embodiments of the invention, the audio content may be received via an input device. In accordance with a number of embodiments, the audio content may be a file storing audio data. In accordance with still some other embodiments, the audio content may be text that is to be converted to an audio rendition. In accordance with a few embodiments, text that includes a string of one more words where each word indicates an expression can be provided.

Audio content can be divided into components (1010). In accordance with some embodiments, the audio content is broken into samples that contain an individual sound or a sufficient small clip of audio data. Each sample or piece of audio content is mapped to a set of rig parameters using the mapping between sets of rig parameters and samples. A playback list of the set of rig parameters can be generated. In accordance with some embodiments, the playback list may only include a portion of the determined sets of rig parameters. Preferably, the portion includes a sufficient number of sets to give the appearance of synchronization between the animation and the audio content when the animation and audio content are played back concurrently.

Where the text indicates expressions to generate, the process may receive the string of text, parse the text to determine words and use a mapping of words to sets of rig parameters to generate determine the set of rig parameters associated with each word and generate a playlist of the determined sets of rig parameters.

A playlist can be applied to the rig of the 3D model during playback to animate the model (1025). In accordance with some embodiments, the playlist may be provided to another application being executed by the device or may be transmitted to another device over a communication network for playback by the other device. The audio from the audio content or generated from the audio content can be played back concurrently with the animation from the playback list (1030).

Although various processes for generating computer animations of 3D models of heads from input audio content can be utilized to generate computer animations of 3D models of faces, heads, and/or avatars are described with reference to FIG. 10, other processes that generate computer animations may vary based on the requirements of the system in accordance with some other embodiments of the invention.

Although the present invention has been described in certain specific aspects, many additional modifications and variations would be apparent to those skilled in the art. It is therefore to be understood that the present invention may be practiced otherwise than specifically described, including any variety of models of and machine learning techniques to learn the 3D shape of human faces and the manner in which to animate 3D models of heads to mimic facial movements during speech, without departing from the scope and spirit of the present invention. Thus, embodiments of the present invention should be considered in all respects as illustrative and not restrictive.

What is claimed is:

1. A system for use in generating computer animations from captured audio data comprising:
   one or more processors;
   memory accessible by each of the one or more processors; and
   instructions stored in the memory that are read by the one or more processors and direct the one or more processors to:
      receive a set of audio data representing speech of an individual;
      generate animation curves that drive an animation rig to animate a 3D model based on the set of audio data by:
         identifying portions of the audio data,
         identifying a set of rig parameters for each identified portion of the audio data to generate a sequence of rig parameters, and
         determining animation curves for animating the animation rig from the generated sequence of rig parameters.

2. The system of claim 1, wherein the set of audio data comprises text with a plurality of words, wherein each word is a portion of the audio data.

3. The system of claim 1, wherein the set of audio data comprises recorded audio content, wherein each portion is a sampled portion of the audio content.

4. The system of claim 3, wherein the received audio data further comprises synchronized video data, wherein identifying portions of the audio data comprises sampling portions of the audio content at a framerate of the synchronized video data.

5. The system of claim 1, wherein the set of audio data comprises generated audio content that is generated from text with a plurality of words.

6. The system of claim 1, wherein identifying the set of rig parameters comprises selecting a set of rig parameters that is mapped to the identified portion of the audio data from a plurality of rig parameters that are mapped to different possible portions of audio data.

7. The system of claim 6 further comprising instructions for generating the mapped plurality of rig parameters based on synchronized audio and video data.

8. The system of claim 7, wherein the synchronized audio and video data comprises recorded audio and video content of the individual.

9. The system of claim 7, wherein the synchronized audio and video data comprises recorded audio and video content of a plurality of different individuals.

10. The system of claim 7, wherein generating the mapped plurality of rig parameters comprises using a learning engine to generate mappings between each set of rig parameters and a set of samples of the input audio.

11. The system of claim 10, wherein the learning engine is a convolutional neural network.

12. The system of claim 7, wherein rig parameters of the plurality of rig parameters are nonlinearly related to shape changes for the 3D model.

13. The system of claim 7, wherein generating the mapped plurality of rig parameters further comprises:
   generating video images using the generated animation curves, the animation rig and a 3D model where the animation rig is mapped to blend shapes of the 3D model;
   comparing the generated video images to the synchronized video data;
   determining whether animation of the generated video images is realistic based on the comparison; and
   optimizing the animation of the generated video images based on the comparison.

14. The system of claim 13, wherein generating the mapped plurality of rig parameters further comprises adding noise to the generated video images prior to the comparison.

15. The system of claim 13, wherein the comparing of the generated video image to the synchronized video data is performed by a discriminator network, where the discriminator network is a neural network.

16. The system of claim 13, wherein generating the mapped plurality of rig parameters further comprises instructions for:
   mapping identified features in the video data to blend shapes of the animation rig; and
   tracking the identified features in the video data.

17. The system of claim 16, wherein the mapping of the identified features to blend shapes of the animation rig is performed using at least one of a Convolutional Neural Network (CNN) and a Recurrent Neural Network (RNN).

18. The system of claim 16, wherein the tracking of the identified features is performed using at least one of a Convolutional Neural Network (CNN) and a Recurrent Neural Network (RNN).

19. The system of claim 16, wherein the tracking of identified features in the video data is performed on a per pixel basis.

20. The system of claim 1, wherein the generating of the animation curves is performed in a plurality of stages wherein each stage determines animation curves for a different subset of features of the 3D model.

21. The system of claim 1, wherein the system further comprises instructions for directing the one or more processors to generate an animated sequence of images from the generated animation curves, the animation rig, and the mapping of the blend shapes of the animation rig to the blend shapes of the 3D model.

* * * * *